US011653654B1

(12) United States Patent
Batton

(10) Patent No.: US 11,653,654 B1
(45) Date of Patent: May 23, 2023

(54) WATER-BASED INSECT REPELLENT COMPOSITION

(71) Applicant: S. C. JOHNSON & SON, INC., Racine, WI (US)

(72) Inventor: Chyree S. Batton, West Allis, WI (US)

(73) Assignee: S. C. JOHNSON & SON, INC., Racine, WI (US)

( * ) Notice: Subject to any disclaimer, the term of this patent is extended or adjusted under 35 U.S.C. 154(b) by 0 days.

(21) Appl. No.: 17/836,897

(22) Filed: Jun. 9, 2022

(51) Int. Cl.
*A01N 65/28* (2009.01)
*A01P 17/00* (2006.01)
*A01N 65/08* (2009.01)
*A01N 31/16* (2006.01)
*A01N 25/24* (2006.01)
*A01N 65/44* (2009.01)
*A01N 31/02* (2006.01)
*A01N 65/22* (2009.01)

(52) U.S. Cl.
CPC ............. *A01N 65/28* (2013.01); *A01N 25/24* (2013.01); *A01N 31/02* (2013.01); *A01N 31/16* (2013.01); *A01N 65/08* (2013.01); *A01N 65/22* (2013.01); *A01N 65/44* (2013.01); *A01P 17/00* (2021.08)

(58) Field of Classification Search
None
See application file for complete search history.

(56) References Cited

U.S. PATENT DOCUMENTS

| 7,201,926 | B2 | 4/2007 | Fried et al. |
| 7,232,844 | B2 | 6/2007 | Hallahan |
| 8,397,427 | B2 | 3/2013 | Schneidmiller et al. |
| 9,326,524 | B1 | 5/2016 | Jack et al. |
| 9,999,218 | B2 | 6/2018 | Manhas et al. |
| 9,999,227 | B2 | 6/2018 | Manhas et al. |
| 10,149,481 | B2 | 12/2018 | Bissinger et al. |
| 10,785,977 | B2 | 9/2020 | Vandock et al. |
| 10,905,114 | B2 | 2/2021 | Manhas et al. |
| 2007/0053947 | A1 | 3/2007 | Emerson |
| 2007/0190094 | A1 | 8/2007 | Bessette |
| 2007/0224232 | A1 | 9/2007 | Sherwood |
| 2008/0187607 | A1 | 8/2008 | Bessette |
| 2008/0274072 | A1 | 11/2008 | Manolas et al. |
| 2009/0148528 | A1 | 6/2009 | Georges |
| 2010/0120724 | A1 | 5/2010 | Bessette |
| 2013/0017281 | A1 | 1/2013 | Nouvel |
| 2013/0183392 | A1 | 7/2013 | Moore et al. |
| 2014/0050809 | A1 | 2/2014 | Angone |
| 2014/0335140 | A1 | 11/2014 | Hoag et al. |
| 2017/0118998 | A1 | 5/2017 | Bessette et al. |
| 2017/0208822 | A1 | 7/2017 | Murray et al. |
| 2017/0231231 | A1 | 8/2017 | Enan |
| 2017/0319465 | A1 | 11/2017 | Murray et al. |
| 2018/0014513 | A1 | 1/2018 | Mascari et al. |
| 2018/0035674 | A1 | 2/2018 | Schmidt et al. |
| 2019/0208778 | A1 | 7/2019 | Schmidt et al. |
| 2019/0373898 | A1 | 12/2019 | Murray et al. |
| 2019/0380350 | A1 | 12/2019 | Murray et al. |
| 2020/0222297 | A1 | 7/2020 | Park et al. |
| 2020/0390110 | A1 | 12/2020 | Lane |
| 2021/0145011 | A1 | 5/2021 | Li et al. |

FOREIGN PATENT DOCUMENTS

| EP | 1299500 A2 | 1/2012 |
| WO | 2007014575 A1 | 2/2007 |
| WO | 2007129818 A1 | 11/2007 |
| WO | 2020176697 A1 | 9/2020 |
| WO | 2020180269 A1 | 9/2020 |
| WO | 2020198853 A1 | 10/2020 |
| WO | 2020261084 A1 | 12/2020 |
| WO | 2002087527 A1 | 11/2022 |

*Primary Examiner* — Terry A McKelvey
*Assistant Examiner* — Catheryne Chen
(74) *Attorney, Agent, or Firm* — Quarles & Brady LLP

(57) ABSTRACT

A composition for repelling insects is disclosed. The composition may include an active component made of (i) a combination of clove oil, geranium oil, and peppermint oil, (ii) a fixative, and (iii) a solubilizer. The composition may include (i) from about 2.5 to about 15 wt. % of an active component made only of (a) from about 0.1 to about 5.0 wt. % of clove oil, (b) from about 0.5 to about 15.0 wt. % of geranium oil, and (c) from about 0.1 to about 15.0 wt. % of peppermint oil, (ii) from about 3 to about 15 wt. % of a fixative, and (iii) from about 15 to about 45 wt. % of a solubilizer.

20 Claims, No Drawings

WATER-BASED INSECT REPELLENT COMPOSITION

BACKGROUND

1. Technology Field

The present disclosure relates to the field of insect repellent technology.

2. Description of the Background

A variety of insects such as mosquitoes and house flies bite and otherwise annoy humans. Various means have been developed to inhibit this. One approach is to place a volatile insect repellent chemical directly on human skin. In addition to efficacy, a number of factors influence the use of personal insect repellents including safety (whether actual or perceived) and aesthetics such as skin feel and odor.

There are many commercially available mosquito repellents; for example, DEET has been shown in many studies to exhibit good repellency against numerous mosquito species. DEET has been used for decades with very few reports of toxicity; however, the belief that DEET is a health and environmental hazard still exists for some people.

Consumers are increasingly looking to natural solutions for pest control especially in the personal repellent space. These consumers have a profile that leads them to natural products including: (i) they have a chemophobia of synthetic actives like DEET; (ii) they have a positive perception of essential oils as natural and safe; (iii) they are more forgiving of efficacy if a product is deemed "natural"; and (iv) they want to use products on infants and children. As a result, plant-based essential oil insect repellents have been proposed as an alternative to DEET and other synthetic insect repellents.

Under the Federal Insecticide, Fungicide and Rodenticide Act (FIFRA) section 25(b)(2), the U.S. Environmental Protection Agency (EPA) may exempt from the requirements of FIFRA any pesticide that is "of a character unnecessary to be subject to [FIFRA]." Pursuant to this authority, the EPA provides lists of pesticides that are exempt from FIFRA regulation. A number of plant-based essential oil repellents are available commercially, in many cases due to their rapid registration process under the U.S. EPA's FIFRA section 25(b).

Many of the ingredients on the FIFRA section 25(b) list are highly volatile essential oils, causing them to provide only short-term repellent duration as they evaporate rapidly, and/or absorb into skin. Increasing the concentration of the essential oil active ingredient can lengthen the duration of repellency; however, many essential oils are irritating to the skin above a certain concentration. Formulators have also dealt with rapid evaporation of essential oils by developing oil-based formulations. Because oils tend to stay on the skin longer than water-based formulations and essential oils are oil soluble, the rationale is that this will help extend repellency duration. However, the consequences of this approach are that, for example, the formula ends up being greasy/oily on the skin and often does not extend duration appreciably. Consequently, the aesthetics (e.g., skin feel, odor, appearance, residual odor, discoloration, etc.) of many plant-based essential oil repellents are poor.

A prevailing issue with many essential oil-based formulations is that they do not repel mosquitoes or only repel them for a short time (i.e., 60 minutes or less). Thus, a problem with essential oil-based repellents is that they may not repel mosquitoes effectively, and/or they may have negative sensory attributes (negative skin feel, negative smell profile). As it stands, the majority of section 25(b) formulations on the market fall into three categories: (1) low duration, negative skin feel; (2) long duration, negative skin feel; and (3) low duration, positive skin feel. Applicant is not aware of any commercially available formulas that have positive skin feel and long duration.

Therefore, there is a need for an insect repellent composition including one or more essential oils wherein the insect repellent composition provides a high level of repellency for an extended period of time while simultaneously exhibiting desirable aesthetics, such as pleasant odor and positive skin feel.

SUMMARY

In one embodiment, the disclosure includes a composition for repelling insects, with an active component including at least one of: (a) clove oil, geranium oil, and peppermint oil; or (b) clove oil, thyme oil, and citronella oil. The composition also has a fixative and a solubilizer. The peppermint oil may be the oil of *Mentha arvenis*, the oil of *Mentha piperita*, and any combination thereof.

In one embodiment, the disclosure includes a composition for repelling insects, with an active component including: a) at least one essential oil selected from the group consisting of clove oil, geraniol, and lemongrass oil, and b) at least two essential oils selected from the group consisting of peppermint oil, geranium oil, thyme oil, citronella oil, and eugenol. The composition also has a fixative and a solubilizer. The peppermint oil may be the oil of *Mentha arvenis*, the oil of *Mentha piperita*, and any combination thereof.

In an embodiment, the disclosure includes a water-based composition for repelling insects with an active component including at least three essential oils selected from clove oil, peppermint oil, geranium oil, thyme oil, citronella oil, geraniol, lemongrass oil, and eugenol. The composition also has a fixative and a solubilizer. The composition further has a carrier. The peppermint oil may be the oil of *Mentha arvenis*, the oil of *Mentha piperita*, and any combination thereof.

In an embodiment, the disclosure includes a water-based composition for repelling insects with about 5 wt. % to about 15 wt. % of an active component including (a) from about 0.1 wt. % to about 3.0 wt. % of clove oil; (b) from about 0.5 wt. % to about 10.0 wt. % of geranium oil; and (c) from about 0.1 wt. % to about 10.0 wt. % of peppermint oil. The composition also has from about 3 wt. % to about 15 wt. % of a fixative and from about 5 wt. % to about 15 wt. % of a solubilizer. The composition further has from about 60 wt. % to about 80 wt. % of a carrier, and from about 0.1 wt. % to about 5.0 wt. % of an emulsifier. The peppermint oil may be the oil of *Mentha arvenis*, the oil of *Mentha piperita*, and any combination thereof.

In another embodiment, the disclosure includes a water-based composition for repelling insects with an active component consisting essentially of (a) from about 0.1 wt. % to about 3.0 wt. % of clove oil; (b) from about 0.5 wt. % to about 10.0 wt. % of geranium oil; and (c) from about 0.1 wt. % to about 10.0 wt. % of peppermint oil. The composition also has a fixative and a solubilizer. The peppermint oil may be the oil of *Mentha arvenis*, the oil of *Mentha piperita*, and any combination thereof. Additionally, the composition has a Complete Protection Time (CPT) that is greater than or equal to 2.5 hours.

DETAILED DESCRIPTION

The term "about," as used herein, refers to variation in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values ±5% of the numeric value that the term precedes.

In an embodiment composition for repelling insects, the composition includes:
 i. an active component comprising:
  a) clove oil, geranium oil, and peppermint oil; or
  b) clove oil, thyme oil, and citronella oil;
 ii. a fixative; and
 iii. a solubilizer.

In an embodiment composition for repelling insects, the composition includes:
 i. an active component comprising:
  a) at least one essential oil selected from the group consisting of clove oil, geraniol, and lemongrass oil; and
  b) at least two essential oils selected from the group consisting of peppermint oil, geranium oil, thyme oil, citronella oil, and eugenol;
 ii. a fixative; and
 iii. a solubilizer In embodiment composition for repelling insects, the composition includes:
 i. an active component comprising:
  a) clove oil;
  b) geranium oil; and
  c) peppermint oil;
 ii. a fixative;
 iii. a solubilizer;
 iv. a carrier;
 v. an emulsifier;
 vi. a humectant; and
 vii. a film former.

In another embodiment composition for repelling insects, the composition includes:
 i. an active component comprising:
  a) clove oil;
  b) geranium oil; and
  c) peppermint oil;
 ii. a fixative;
 iii. a solubilizer;
 iv. a carrier;
 v. an emulsifier; and
 vi. a thickener.

In a particular embodiment composition for repelling insects, the composition includes:
 i. from about 2.5 wt. % to about 15 wt. % of an active component consisting essentially of:
  a) from about 0.1 wt. % to about 5.0 wt. % of clove oil;
  b) from about 0.5 wt. % to about 15.0 wt. % of geranium oil; and
  c) from about 0.1 wt. % to about 15.0 wt. % of peppermint oil;
 ii. from about 1 wt. % to about 15 wt. % of a fixative;
 iii. from about 3 wt. % to about 20 wt. % of a solubilizer;
 iv. from about 60 wt. % to about 85 wt. % of a carrier;
 v. from about 0.1 wt. % to about 7.5 wt. % of an emulsifier,
wherein all weight percentages are percent by weight of the total composition.

Active Component

Essential Oils. The water-based insect repellent formulation includes an active component comprising a combination of essential oils as the insect repelling active ingredient. The combination of essential oils may comprise clove oil, peppermint oil, geranium oil, thyme oil, citronella oil, geraniol, lemongrass oil, eugenol, and any combination thereof. In some embodiments, the combination of essential oils may comprise at least three of: clove oil, peppermint oil, geranium oil, thyme oil, citronella oil, geraniol, lemongrass oil, and eugenol. In some embodiments, the combination of essential oils may comprise at least one of (a) clove oil, geranium oil, and peppermint oil, or at least one of (b) clove oil, thyme oil, and citronella oil.

In some embodiments, the combination of essential oils may comprise a combination of (a) at least one essential oil selected from the group consisting of clove oil, geraniol, and lemongrass oil, and (b) at least two essential oils selected from the group consisting of peppermint oil, geranium oil, thyme oil, citronella oil, and eugenol. In some embodiments, the combination of essential oils may comprise a combination of (a) at least one essential oil selected from the group consisting of clove oil, geraniol, and lemongrass oil, and (b) at least two essential oils selected from the group consisting of peppermint oil, geranium oil, thyme oil, citronella oil, and eugenol. In some embodiments the combination of essential oils may comprise a combination of at least one essential oil from Group A (i.e. a "first essential oil") and at least two essential oils from Group B (i.e. "a second essential oil"). As used herein, an essential oil from Group A is an essential oil that is typically used in a repellent at a relatively low concentration (for example, less than about 2 wt %), due to its repellent efficacy, its effect on human health/safety, and/or a combination thereof. Some examples of essential oils from Group A include, but are not limited to, clove oil, geraniol, and lemongrass oil. As used herein, an essential oil from Group B is an essential oil that is typically used in a repellent at a relatively higher concentration (for example, greater than about 2 wt %), due to its repellent efficacy, its effect on human health/safety, and/or a combination thereof. Some examples of essential oils from Group B include, but are not limited to, peppermint oil, geranium oil, thyme oil, citronella oil, and eugenol.

In some non-limiting examples, the combination of essential oils comprises clove oil, peppermint oil, and geranium oil. One particularly advantageous combination of essential oils consists essentially of clove oil, peppermint oil, and geranium oil. Another advantageous combination of essential oils consists only of clove oil, peppermint oil, and geranium oil.

Particular strains of certain essential oils may be especially well-suited for use in certain water-based insect repellent formulations. For the purposes of this disclosure, "peppermint oil" is defined to be the oil of *Mentha arvenis*, the oil of *Mentha piperita*, and any combination thereof. For example, in certain formulations, it is particularly advantageous to use the *Arvensis* strain of peppermint oil (i.e. *Mentha arvenis*). The oil of *Mentha arvenis* is sometimes commonly referred to as cornmint oil. Without wishing to be bound by any particular theory, *Mentha arvenis* oil may be particularly advantageous due to the unusually high levels of menthol that it contains. One skilled in the art will appreciate that *Mentha arvenis* oil may be difficult to use in certain liquid formulations, as its menthol levels are so high that when distilled the oil is usually solid. One skilled in the art will also recognize that it may be particularly advantageous to configure any and/or all of the embodiments disclosed herein such that some or all of the peppermint oil in a given embodiment is *Mentha arvenis* oil. Additionally, in certain formulations, it may be particularly advantageous to use the *Piperita* strain of peppermint oil (i.e. *Mentha piperita*). One skilled in the art will appreciate that *Mentha piperita* oil may be difficult to use in certain liquid formulations, for reasons similar to those discussed above with respect to *Mentha arvenis* oil. However, one skilled in the art will also recognize that it may be particularly advantageous to configure any and/or all of the embodiments disclosed herein such that some or all of the peppermint oil in a given embodiment is *Mentha piperita* oil. As another example, in certain formulations, it may be advantageous to use a particular type of clove oil, such as clove bud oil, clove leaf oil, or clove stem oil. Without wishing to be bound by any particular theory, different types of clove oil may commonly contain different concentrations of eugenol, which may affect the repellency/efficacy of the particular type of clove oil. Typically, clove bud oil has 60-90 wt % eugenol, clove leaf oil has 70-82 wt % eugenol, and clove stem oil has 85-92 wt % eugenol. One skilled in the art will also recognize that it may be particularly advantageous to configure any and/or all of the embodiments disclosed herein such that some or all of the clove oil in a given embodiment is any one of clove oil, such as clove bud oil, clove leaf oil, clove stem oil, or a combination thereof. As still another example, in certain formulations, it may be advantageous to use a particular strain of geranium oil, such as the Egyptian strain of geranium oil or the Bourbon strain of geranium oil. One skilled in the art will also recognize that it may be particularly advantageous to configure any and/or all of the embodiments disclosed herein such that some or all of the geranium oil in a given embodiment is any one of the Egyptian strains of geranium oil, the Bourbon strain of geranium oil, or a combination thereof.

The total amount active component (i.e. the total amount of essential oils in the composition) may be from about 2.0 wt. %, or from about 2.5 wt. %, or from about 5 wt. %, or from about 6 wt. %, or from about 7 wt. %, or from about 8 wt. %, or from about 9 wt. %, or from about 10 wt. %, and to about 25 wt. %, or to about 22 wt. %, or to about 20 wt. %, or to about 17 wt. %, or to about 15 wt. %, or to about 14 wt. %, or to about 14 wt. %, or to about 13 wt. %, or to about 12 wt. %, or to about 11 wt. %, or to about 10 wt. %. In an embodiment, the total amount active component is present in an amount from about 2.5 wt. % to about 15 wt. %, or from about 5 wt. % to about 15 wt. %, wherein all weight percentages are percent by weight of the total composition. In an embodiment, the total amount active component is present in an amount from about 10 wt. % to about 12 wt. % wherein all weight percentages are percent by weight of the total composition. In an embodiment, the total amount active component is present in an amount of about 10 wt. % based on the total weight of the total composition.

More specifically, in some embodiments the active component may comprise a combination of pre-determined amounts of clove oil, peppermint oil, and geranium oil. For example, the active component may comprise a combination of (i) from about 0.1 wt. % to about 5.0 wt. % of clove oil, (ii) from about 0.5 wt. % to about 15.0 wt. % of geranium oil, and (iii) from about 0.1 wt. % to about 15.0 wt. % of peppermint oil. Some embodiments may comprise from about 0.1 wt. %, or from about 0.2 wt. %, or from about 0.3 wt. %, or from about 0.4 wt. %, or from about 0.5 wt. %, and to about 5.0 wt. % of clove oil, or to about 3.0 wt. % of clove oil, or to about 2.0 wt. % of clove oil, or to about 1.0 wt. % of clove oil, or to about 0.5 wt. % of clove oil. Some embodiments may comprise from about 1 wt. % of geranium oil, or from about 2 wt. %, or from about 3 wt. %, or from about 4 wt. %, or from about 5 wt. % of geranium oil, and to about 15 wt. % of geranium oil, or to about 12 wt. %, or to about 10 wt. %, or to about 8 wt. %, or to about 7 wt. %, or to about 6 wt. %, or to about 5 wt. % of geranium oil. Some embodiments may comprise from about 1 wt. % of peppermint oil, or from about 2 wt. %, or from about 3 wt. %, or from about 4 wt. %, or from about 4.5 wt. % of peppermint oil, and to about 15 wt. % of peppermint oil, or to about 12 wt. %, or to about 10 wt. %, or to about 8 wt. %, or to about 7 wt. %, or to about 6 wt. %, or to about 4.5 wt. % of peppermint oil based on the weight of the total composition.

The active component is combined with a fixative. In some embodiments, the fixative may be selected from the group consisting essentially of, or consisting of vanillin, esters of organic acids, fumed silica, alkoxylated alcohols, glycol ethers, glycerin aliphatic acid esters, polyethylene glycol, and any combination thereof. More specifically, the fixative may be vanillin. Alternatively, the fixative may be a combination of vanillin and triethyl citrate. Still further, the fixative may be a combination of vanillin and fumed silica. The fixative may be present in any suitable amount. For example, the fixative may be present in an amount from about 1 wt. % to about 15 wt. %, or from about 3 wt. % to about 15 wt. %, or from about 5 wt. % to about 10 wt. %, based on the weight of the total composition. Further, the fixative may be present in an amount from about 1 wt. %, or from about 2 wt. %, or from about 3 wt. %, or from about 4 wt. %, or from about 5 wt. %, or from about 6 wt. %, or from about 7 wt. %, and to about 15 wt. %, or to about 13 wt. %, or to about 12 wt. %, or to about 10 wt. %, or to about 8 wt. %, or to about 7 wt. % based on the weight of the total composition.

The active component is combined with a solubilizer. In some embodiments, the solubilizer may be selected from the group consisting of isopropyl alcohol, ethanol, PEG-40 hydrogenated castor oil, ethoxylated $C_8$-$C_{16}$ alcohol, propylene glycol, ethylene glycol n-hexyl ether, and any combination thereof. More specifically, the solubilizer may be isopropyl alcohol. The solubilizer may be present in any suitable amount. For example, the solubilizer may be present in an amount from about 3 wt. % to about 45 wt. %, or from about 5 wt. % to about 45 wt. %, or from about 3 wt. % to about 20 wt. %, or from about 10 wt. % to about 30 wt. %, based on the weight of the total composition. Further, the solubilizer may be present in an amount from about 1 wt. %, or from about 3 wt. %, or from about 5 wt. %, or from about 7 wt. %, or from about 10 wt. %, or from about 20 wt. %, or from about 25 wt. %, or from about 30 wt. %, and to about 50 wt. %, or to about 40 wt. %, or to about 30 wt. %, or to about 20 wt. %, or to about 15 wt. %, or to about 10 wt. % based on the weight of the total composition.

Water-Based Formulation

A water-based formulation of a composition for repelling insects comprises an active component, as described above. In addition to the active component, a water-based formulation further comprises a fixative, a solubilizer, and a carrier. A water-based formulation may also comprise an emulsifier and a co-emulsifier. Some water-based formulations may further comprise a co-fixative, a co-emulsifier, a thickener, a humectant, and/or a film-former, and any combination thereof. Beneficially, combining the active component with an appropriate water-based formulation may significantly increase the duration that the active component remains on the skin of a person (subject), in an amount sufficient to effectively repel insects, as compared to a simple solution primarily containing only the active component and necessary solvent.

Carrier. The water-based insect repellent formulation may comprise water as a carrier. The carrier may be present in any suitable amount. For example, the carrier may be present in an amount from about 60 wt. % to about 85 wt. %, or from about 60 wt. % to about 80 wt. %, or from about 68 wt. % to about 70 wt. %, based on the weight of the total composition. Further, the carrier may be present in an amount from about 60 wt. %, or from about 65 wt. %, or from about 66 wt. %, or from about 67 wt. %, or from about 68 wt. %, or from about 69 wt. %, or from about 70 wt. %, and to about 80 wt. %, or to about 75 wt. %, or to about 72 wt. %, or to about 70 wt. %, or to about 69 wt. %, or to about 68 wt. % based on the weight of the total composition.

Fixative. The water-based insect repellent formulation may comprise a fixative. As used herein, a fixative, for example, may be used to amplify the intensity and lasting qualities of the essential oil active ingredients of the formulation. Non-limiting example fixatives include vanillin, esters of organic acids (e.g., triethyl citrate), silica, alkoxylated alcohols, glycol ethers, glycerin aliphatic acid esters, polyethylene glycol, and any combination thereof. One particularly advantageous fixative is vanillin. Another particularly advantageous fixative is a combination of vanillin and triethyl citrate. Another particularly advantageous fixative is a combination of vanillin and silica. The fixative may be present in any suitable amount. For example, the fixative may be present in an amount from about 1 wt. % to about 15 wt. %, or from about 3 wt. % to about 15 wt. %, or from about 5 wt. % to about 10 wt. %, based on the weight of the total composition. Further, the fixative may be present in an amount from about 2 wt. %, or from about 3 wt. %, or from about 4 wt. %, or from about 5 wt. %, or from about 7 wt. %, or from about 9 wt. %, or from about 10 wt. %, and to about 15 wt. %, or to about 13 wt. %, or to about 11 wt. %, or to about 10 wt. %, or to about 7 wt. %, or to about 5 wt. % based on the weight of the total composition.

Co-Fixative. In some embodiments, the water-based insect repellent formulation may also comprise a co-fixative. As used herein, a co-fixative may be an additional second fixative component, in addition to an initial fixative as described above. A co-fixative may be used for the same or similar purpose as an initial fixative, for example the co-fixative may also be used to amplify the intensity and lasting qualities of the essential oil active ingredients of the formulation. A co-fixative may be present in the same amount or in a different amount than the initial fixative. For example, the co-fixative itself may be present in an amount from about 1 wt. % to about 15 wt. %, or from about 3 wt. % to about 15 wt. %, or from about 5 wt. % to about 10 wt. %, based on the weight of the total composition. Further, the co-fixative itself may be present in an amount from about 2 wt. %, or from about 3 wt. %, or from about 4 wt. %, or from about 5 wt. %, or from about 7 wt. %, or from about 9 wt. %, or from about 10 wt. %, and to about 15 wt. %, or to about 13 wt. %, or to about 11 wt. %, or to about 10 wt. %, or to about 7 wt. %, or to about 5 wt. % based on the total weight of the composition. Additionally, the initial fixative and the co-fixative may each be present in an amount such that the total amount of fixative (initial fixative+co-fixative) is from about 1 wt. % to about 15 wt. %, or from about 3 wt. % to about 15 wt. %, or from about 5 wt. % to about 10 wt. %, based on the weight of the total composition. Further, the total amount of fixative may be from about 2 wt. %, or from about 3 wt. %, or from about 4 wt. %, or from about 5 wt. %, or from about 7 wt. %, or from about 9 wt. %, or from about 10 wt. %, and to about 15 wt. %, or to about 13 wt. %, or to about 11 wt. %, or to about 10 wt. %, or to about 7 wt. %, or to about 5 wt. % based on the weight of the total composition. In a particular embodiment, the initial fixative may be present in an amount of about 5 wt. % and the co-fixative may also be present in an amount of about 5 wt. % based on the weight of the total composition.

Solubilizer. The water-based insect repellent formulation may also comprise a solubilizer, for example, for dissolving or dispersing the combination of essential oils of the formulation in water. Non-limiting example solubilizers include $C_1$-$C_8$ alcohols (e.g., isopropyl alcohol), hydrogenated and polyethoxylated oils (e.g., PEG-40 hydrogenated castor oil), alkoxylated alcohols (e.g., ethoxylated $C_8$-$C_{16}$ alcohol), alkylene glycols (e.g., propylene glycol), glycol ethers (e.g., ethylene glycol n-hexyl ether), carbonate esters (e.g. propylene carbonate), and fatty acids (especially short chain fatty acids) such as $C_1$-$C_{18}$ short chain fatty acids including lauric acid and oleic acid, and any combination thereof. One particularly advantageous solubilizer is isopropyl alcohol. The solubilizer may be present in any suitable amount. For example, the solubilizer may be present in an amount from about 3 wt. % to about 45 wt. %, or from about 5 wt. % to about 45 wt. %, or from about 3 wt. % to about 20 wt. %, or from about 5 wt. % to about 15 wt. %, based on the weight of the total composition. Further, the solubilizer may be present in an amount from about 3 wt. %, or from about 5 wt. %, or from about 7 wt. %, or from about 8 wt. %, or from about 9 wt. %, or from about 10 wt. %, and to about 25 wt. %, or to about 15 wt. %, or to about 13 wt. %, or to about 12 wt. %, or to about 11 wt. %, or to about 10 wt. % based on the weight of the total composition.

Emulsifier. The water-based insect repellent formulation may comprise an emulsifier, for example, for promoting formation of a stable emulsion, particularly of the essential oil active ingredients, in water, thereby increasing the dispersion of the essential oils in the formulation. Non-limiting example emulsifiers may include saponins, glycerin aliphatic acid esters (e.g., polyglyceryl oleate, glyceryl oleate), gum arabic, mustard, lecithin (such as soy or egg lecithin), carrageenan, guar gum, monoglycerides, diglycerides, polysorbates (e.g., sorbitan monooleate), glyceryl ethers, alkyl sulfate anionic surfactants (e.g., sodium dodecyl sulfate), alkyl ether sulfate anionic surfactants (e.g., sodium lauryl ether sulfate), and any combination thereof. In some non-limiting examples, the emulsifier is a saponin. One particularly advantageous emulsifier is at least one of, or a combination of, a *Quillaja* saponin and a polyglyceryl oleate. In some non-limiting examples, the emulsifier is a polyglyceryl oleate. For example, in an embodiment, the emulsifier may be a polyglyceryl-10-oleate, a polyglyceryl-6-oleate, a polyglyceryl-3-oleate, or a combination thereof. In a particular embodiment, the emulsifier may include a combination of a polyglyceryl-10-oleate and a polyglyceryl-3-oleate, for example about 0.7 wt % of a polyglyceryl-10-oleate and about 0.3 wt % of a polyglyceryl-3-oleate. In another embodiment, the emulsifier may include a combination of a polyglyceryl-10-oleate and a polyglyceryl-6-oleate, for example about 0.7 wt % of a polyglyceryl-10-oleate and about 0.3 wt % of a polyglyceryl-6-oleate. In another embodiment, the emulsifier may include a combination of a polyglyceryl-3-oleate and a polyglyceryl-6-oleate, for example about 0.7 wt % of a polyglyceryl-3-oleate and about 0.3 wt % of a polyglyceryl-6-oleate. One skilled in the art will also recognize that it may be particularly advantageous to configure any and/or all of the embodiments disclosed herein such that some or all of the emulsifier in a given embodiment is a polyglyceryl oleate, such as any one of a polyglyceryl-10-oleate, a polyglyceryl-6-oleate, a polyglyceryl-3-oleate, or a combination thereof. The emulsifier may be present in any suitable amount. For example, the emulsifier may be present in an amount from about 0.1 wt. % to about 7.5 wt. %, or from about 0.1 wt. % to about 3 wt. %, or from about 0.5 wt. % to about 1.5 wt. %, based on the weight of the total composition. Further, the emulsifier may be present in an amount from about 0.1 wt. %, or from about 0.34 wt. %, or from about 0.67 wt. %, or from about 0.75 wt. %, or from about 0.9 wt. %, or from about 1.0 wt. %, and to about 7.5 wt. %, or to about 5 wt. %, or to about 3 wt. %, or to about 2 wt. %, or to about 1.5 wt. %, or to about 1.34 wt. %, or to about 1.25 wt. %, or to about 1.0 wt. % based on the weight of the total composition.

Co-emulsifier. In some embodiments, the water-based insect repellent formulation may also comprise a co-emulsifier. As used herein, a co-emulsifier may be an additional second emulsifier component, in addition to an initial emulsifier as described above. A co-emulsifier may be used for the same or similar purpose as an initial emulsifier, for example, the co-emulsifier may also be used, for example, to promote formation of a stable emulsion, particularly of the essential oil active ingredients, in water, thereby increasing the solubility of the essential oils in the formulation. For example, in some non-limiting embodiments, the emulsifier is a combination of, a *Quillaja* saponin and a co-emulsifier that is a polyglyceryl oleate. When a co-emulsifier is used, the emulsifier and co-emulsifier may each be present in any suitable amount. Further, the emulsifier and co-emulsifier may be present in same amount as each other or in different amounts. For example, the co-emulsifier may be present in an amount from about 0.1 wt. % to about 3 wt. %, or from about 0.5 wt. % to about 1.5 wt. %, based on the weight of the total composition. Further, the co-emulsifier may be present in an amount from about 0.1 wt. %, or from about 0.34 wt. %, or from about 0.67 wt. %, or from about 0.75 wt. %, or from about 0.9 wt. %, or from about 1.0 wt. %, and to about 3 wt. %, or to about 2 wt. %, or to about 1.5 wt. %, or to about 1.34 wt. %, or to about 1.25 wt. %, or to about 1.0 wt. % based on the weight of the total composition. Additionally, the emulsifier and the co-emulsifier may be present in any combination such that the total amount of emulsifier component (emulsifier+co-emulsifier) present in the water-based composition is present in any of the above amounts/ranges. In one particularly advantageous embodiment, the emulsifier is present in an amount of about 0.67 wt. %. and the co-emulsifier is present in an amount of about 0.34 wt. %. In another advantageous embodiment, the emulsifier and the co-emulsifier are present in ratio from about 1:2 to about 2:1, based on the amounts of the emulsifier and co-emulsifier measured as wt. %. based on the total weight of the composition.

Thickener. The water-based insect repellent formulation may comprise a thickener in the continuous phase (water), for example, to help thicken the water film to slow down diffusion of the essential oils across the water film. Non-limiting example thickeners include cellulose derivatives (e.g., microcrystalline cellulose), gums (e.g., xanthan gum, cellulose gum, *sclerotium* gum, acacia senegal gum *ceratonia* silique gum, *caesalpinia* spinose gum, gellan gum), pectin, carrageenan, starch (e.g., corn starch), clays (e.g., bentonite), and any combination thereof. Particularly advantageous thickeners include microcrystalline cellulose and cellulose gum. One especially advantageous thickener is a blend of microcrystalline cellulose and cellulose gum. The thickener may be present in any suitable amount. For example, the thickener may be present in an amount from about 0.1 wt. % to about 5 wt. %, or from about 0.5 wt. % to about 1.5 wt. %, based on the weight of the total composition. Further, the thickener may be present in an amount from about 0.1 wt. %, or from about 0.25 wt. %, or from about 0.34 wt. %, or from about 0.5 wt. %, or from about 0.67 wt. %, or from about 0.75 wt. %, or from about 1.0 wt. %, and to about 5 wt. %, or to about 3 wt. %, or to about 2 wt. %, or to about 1.75 wt. %, or to about 1.67 wt. %, or to about 1.5 wt. %, or to about 1.34 wt. %, or to about 1.25 wt. %, or to about 1.0 wt. % based on the weight of the total composition. In some embodiments, the water-based composition may not comprise any thickener, as described above.

Humectant. The water-based insect repellent formulation may comprise a humectant, for example, for reducing the loss of moisture in the formulation. Non-limiting example humectants include glycerin, propylene glycol, diglycerin, sodium pryoglutamic acid, polyglutamic acid, hyaluronic acid, pentylene glycol, squalene, sodium hyaluronate, butylene glycol, aloe vera, coconut butter, and any combination thereof. One particularly advantageous humectant is glycerin. The humectant may be present in any suitable amount. For example, the humectant may be present in an amount from about 0.1 wt. % to about 5 wt. %, or from about 1 wt. % to about 3 wt. %, based on the weight of the total composition. Further, the humectant may be present in an amount from about 0.1 wt. %, or from about 0.5 wt. %, or from about 1 wt. %, or from about 1.5 wt. %, or from about 1.67 wt. %, or from about 1.75 wt. %, or from about 2.0 wt. %, and to about 5 wt. %, or to about 4 wt. %, or to about 3 wt. %, or to about 2.75 wt. %, or to about 2.67 wt. %, or to about 2.5 wt. %, or to about 2.34 wt. %, or to about 2.25 wt. %, or to about 2.0 wt. % based on the weight of the total composition. In some embodiments, the water-based composition may not comprise any humectant as described above.

Film Former. The water-based insect repellent formulation may comprise a film former, for example, to reduce dermal absorption and provide a degree of waterproofing functionality to the applied formulation. Non-limiting example film formers may include cellulose derivatives (e.g., hydroxypropyl methylcellulose, hydroxyethyl cellulose, hydroxyethyl ethyl cellulose, hydroxypropyl cellulose, ethylcellulose, hydroxybutyl methylcellulose, carboxymethyl hydroxyethyl cellulose), acrylamide polymers and copolymers, acrylate polymers and copolymers, waxes (e.g. beeswax, carnauba wax, sunflower wax) alginates, carrageenan, cellulose gum, hydroxypropyl guar, maltodextrin, polyacrylamide, polyacrylic acid, polyethylene, polyquaterniums, polyvinyl acetate, polyvinyl alcohol, tragacanth gum, and any combination thereof. One particularly advantageous film former is hydroxypropyl methylcellulose. The film former may be present in any suitable amount. For example, the film former may be present in an amount from about 0.1 wt. % to about 5 wt. %, or from about 1 wt. % to about 3 wt. %, based on the weight of the total composition. Further, the film former may be present in an amount from about 0.1 wt. %, or from about 0.5 wt. %, or from about 1 wt. %, or from about 1.5 wt. %, or from about 1.67 wt. %, or from about 1.75 wt. %, or from about 2.0 wt. %, and to about 5 wt. %, or to about 4 wt. %, or to about 3 wt. %, or to about 2.75 wt. %, or to about 2.67 wt. %, or to about 2.5 wt. %, or to about 2.34 wt. %, or to about 2.25 wt. %, or to about 2.0 wt. % based on the weight of the total composition. In some embodiments, the water-based composition may not comprise any film former as described above.

Emollient. Certain water-based formulations may comprise an emollient, for example, for retaining essential oils on the skin longer. Choosing emollients that have low dermal penetration can assist in retaining essential oils on the skin longer compared to formulations not containing the emollient. An emollient may help to maintain the integrity of the hydrolipids of the skin. Non-limiting example emollients include alkanes and mixtures thereof (e.g., mineral oil, paraffin oil), fatty acids (e.g., lauric acid, oleic acid, and stearic acid), fatty alcohols (e.g., cetyl alcohol), esters (e.g., benzoic acid esters of $C_9$-$C_{15}$ alcohols), silicones (e.g., dimethyl polysiloxane), ethers (e.g., polyoxypropylene butyl ethers and polyoxypropylene cetyl ethers), isopropyl myristate, coconut oil, grape seed oil, red raspberry seed oil, shea butter, and any combination thereof. In some non-limiting examples, the emollient is mineral oil. In some embodiments, the emollient is a combination of mineral oil and lauric acid. One particularly advantageous emollient that is especially well-suited for use in water-based formulations is isopropyl myristate.

The emollient may be present in any suitable amount. For example, the emollient may be present in an amount from about 0.1 wt. % to about 25 wt. %, or from about 0.5 wt. % to about 15 wt. %, based on the weight of the total composition. Further, the emollient may be present in an amount from about 0.1 wt. %, or from about 0.5 wt. %, or from about 1.0 wt. %, or from about 1.5 wt. %, or from about 2 wt. %, or from about 5 wt. %, or from about 9 wt. %, and to about 25 wt. %, or to about 15 wt. %, or to about 12 wt. %, or to about 11 wt. %, or to about 10 wt. %, or to about 9 wt. %., or to about 8 wt. %, or to about 5 wt. %, or to about 3 wt. %, or to about 2 wt. % based on the weight of the total composition.

Encapsulant. Encapsulation of synthetic and natural actives have been shown to reduce evaporation, reduce dermal absorption, enhance skin feel, and extend duration. The water-based insect repellent formulation and/or the oil-based insect repellent formulation may comprise an encapsulation material for reducing evaporation, and/or reducing dermal absorption, and/or enhancing skin feel, and/or extending duration of the essential oils in the formulation. Specifically, encapsulation materials can extend the duration of the certain active ingredients (i.e. certain essential oils) by controlling/slowing the release of the essential oil from within the encapsulant, limiting the amount of the essential oil that is available for activity and/or evaporation at any one time. Suitable encapsulation materials for use in the formulation are selected from polymers; capsules, microcapsules and nanocapsules; synthetic polymers and biomaterials including proteins, gums, and carbohydrates; liposomes, absorbents; cyclic oligosaccharides, and any combination thereof. Example advantageous encapsulation materials are cyclic oligosaccharides having a cyclic structure comprising six or more saccharide units. It is common in the art to abbreviate six, seven and eight membered cyclic oligosaccharides to α, β and γ respectively. Particularly advantageous encapsulation materials are α-cyclodextrins or β-cyclodextrins, preferably β-cyclodextrins. The levels of cyclic oligosaccharides used in the formulation will be dependent on the components of the formulation and their levels, for example the combination of essential oils, present in the formulation. The encapsulation material may be present in any suitable amount. In some embodiments, the water-based composition may not comprise any encapsulation material.

Water-based Insect Repellent Formulations. Water-based insect repellent formulations of the present disclosure may comprise:
  i. an active component;
  ii. a fixative;
  iii. a solubilizer;
  iv. a carrier; and
  v. an emulsifier.

The active component may comprise clove oil, peppermint oil, and geranium oil. In particular embodiments the active component may consist only of clove oil, peppermint oil, and geranium oil.

In an embodiment, the water-based composition may include (i) active component, (ii) fixative, (iii) solubilizer, (iv) carrier, and (v) emulsifier, each of which may be present in any amount suitable, and more specifically may be present in any of the amounts discussed for each component above.

In one advantageous embodiment, a water-based composition may comprise:
  i. from about 2.5 wt. % to about 15 wt. % of an active component consisting essentially of at least three essential oils;
  ii. from about 1 wt. % to about 15 wt. % of a fixative;
  iii. from about 3 wt. % to about 20 wt. % of a solubilizer;
  iv. from about 60 wt. % to about 85 wt. % of a carrier;
  v. from about 0.1 wt. % to about 7.5 wt. % of an emulsifier.

In a particular version of the above advantageous embodiment, the active component may consist essentially of:
  a) from about 0.1 wt. % to about 5.0 wt. % of clove oil;
  b) from about 0.5 wt. % to about 15.0 wt. % of geranium oil; and
  c) from about 0.1 wt. % to about 15.0 wt. % of peppermint oil.

In another version of the above advantageous embodiment, the active component may consist essentially of:
  a) at least one essential oil selected from the group consisting of clove oil, geraniol, and lemongrass oil; and
  b) at least two essential oils selected from the group consisting of peppermint oil, geranium oil, thyme oil, citronella oil, and eugenol.

In still another version of the above advantageous embodiment, the active component may consist essentially of:
  a) clove oil, geranium oil, and peppermint oil; or
  b) clove oil, thyme oil, and citronella oil.

In yet another version of the above advantageous embodiment, the active component may consist essentially of clove oil, geranium oil, and peppermint oil.

In another advantageous embodiment, the water-based insect repellent formulations of the present disclosure comprise:
  i. an active component;
  ii. a fixative;
  iii. a solubilizer;
  iv. a carrier;
  v. an emulsifier;
  vi. a humectant; and
  vii. a film former.

In a particular version of the above advantageous embodiment, the active component may consist essentially of:
  a) from about 0.1 wt. % to about 5.0 wt. % of clove oil;
  b) from about 0.5 wt. % to about 15.0 wt. % of geranium oil; and
  c) from about 0.1 wt. % to about 15.0 wt. % of peppermint oil.

In another version of the above advantageous embodiment, the active component may consist essentially of:
  a) at least one essential oil selected from the group consisting of clove oil, geraniol, and lemongrass oil; and
  b) at least two essential oils selected from the group consisting of peppermint oil, geranium oil, thyme oil, citronella oil, and eugenol.

In still another version of the above advantageous embodiment, the active component may consist essentially of:
  a) clove oil, geranium oil, and peppermint oil; or
  b) clove oil, thyme oil, and citronella oil.

In yet another version of the above advantageous embodiment, the active component may consist essentially of clove oil, geranium oil, and peppermint oil.

In an embodiment, the water-based composition may include (i) active component, (ii) fixative, (iii) solubilizer, (iv) carrier, (v) emulsifier, (vi) humectant, and (vii) film former, each of which may be present in any amount suitable, and more specifically may be present in any of the amounts discussed for each component above.

In one advantageous embodiment, a water-based composition may comprise:
  i. from about 2.55 wt. % to about 15 wt. % of an active component consisting essentially of:
    a) from about 0.1 wt. % to about 5.0 wt. % of clove oil;
    b) from about 0.5 wt. % to about 15.0 wt. % of geranium oil; and
    c) from about 0.1 wt. % to about 15.0 wt. % of peppermint oil;
  ii. from about 1 wt. % to about 15 wt. % of a fixative;
  iii. from about 3 wt. % to about 20 wt. % of a solubilizer;
  iv. from about 60 wt. % to about 85 wt. % of a carrier;
  v. from about 0.1 wt. % to about 7.5 wt. % of an emulsifier;
  vi. from about 0.1 wt. % to about 5.0 wt. % of a humectant; and
  vii. from about 0.1 wt. % to about 5.0 wt. % of a film former.

In a particular version of the above advantageous embodiment, the active component may consist essentially of:
  a) from about 0.1 wt. % to about 5.0 wt. % of clove oil;
  b) from about 0.5 wt. % to about 15.0 wt. % of geranium oil; and
  c) from about 0.1 wt. % to about 15.0 wt. % of peppermint oil.

In another version of the above advantageous embodiment, the active component may consist essentially of:
  a) at least one essential oil selected from the group consisting of clove oil, geraniol, and lemongrass oil; and
  b) at least two essential oils selected from the group consisting of peppermint oil, geranium oil, thyme oil, citronella oil, and eugenol.

In still another version of the above advantageous embodiment, the active component may consist essentially of:
  a) clove oil, geranium oil, and peppermint oil; or
  b) clove oil, thyme oil, and citronella oil.

In yet another version of the above advantageous embodiment, the active component may consist essentially of clove oil, geranium oil, and peppermint oil.

In another advantageous embodiment, a water-based composition may comprise:
  i. from about 8 wt. % to about 12 wt. % of an active component consisting of:
    a) from about 0.1 wt. % to about 1.0 wt. % of clove oil;
    b) from about 4.5 wt. % to about 7.5 wt. % of geranium oil; and
    c) from about 3.0 wt. % to about 6.0 wt. % of peppermint oil;
  ii. from about 5 wt. % to about 10 wt. % of a fixative that includes vanillin;
  iii. from about 5 wt. % to about 15 wt. % of a solubilizer that includes isopropyl alcohol;
  iv. from about 60 wt. % to about 80 wt. % of a carrier that includes water;
  v. from about 0.5 wt. % to about 1.5 wt. % of an emulsifier that includes at least one of a *Quillaja saponin* and a polyglyceryl oleate;
  vi. from about 1 wt. % to about 3 wt. % of a humectant that includes glycerin; and
  vii. from about 1 wt. % to about 3 wt. % of a film former that includes hydroxypropyl methylcellulose.

In a particular version of the above advantageous embodiment, the active component may consist essentially of:
  a) from about 0.1 wt. % to about 5.0 wt. % of clove oil;
  b) from about 0.5 wt. % to about 15.0 wt. % of geranium oil; and
  c) from about 0.1 wt. % to about 15.0 wt. % of peppermint oil.

In another version of the above advantageous embodiment, the active component may consist essentially of:
  a) at least one essential oil selected from the group consisting of clove oil, geraniol, and lemongrass oil; and
  b) at least two essential oils selected from the group consisting of peppermint oil, geranium oil, thyme oil, citronella oil, and eugenol.

In still another version of the above advantageous embodiment, the active component may consist essentially of:
  a) clove oil, geranium oil, and peppermint oil; or
  b) clove oil, thyme oil, and citronella oil.

In yet another version of the above advantageous embodiment, the active component may consist essentially of clove oil, geranium oil, and peppermint oil.

Certain specific water-based insect repellent formulations comprise:
  i. an active component;
  ii. a fixative;
  iii. a solubilizer;
  iv. a carrier;
  v. an emulsifier; and
  vi. a thickener.

In a particular version of the above advantageous embodiment, the active component may consist essentially of:
  a) from about 0.1 wt. % to about 5.0 wt. % of clove oil;
  b) from about 0.5 wt. % to about 15.0 wt. % of geranium oil; and
  c) from about 0.1 wt. % to about 15.0 wt. % of peppermint oil.

In another version of the above advantageous embodiment, the active component may consist essentially of:
 a) at least one essential oil selected from the group consisting of clove oil, geraniol, and lemongrass oil; and
 b) at least two essential oils selected from the group consisting of peppermint oil, geranium oil, thyme oil, citronella oil, and eugenol.

In still another version of the above advantageous embodiment, the active component may consist essentially of:
 a) clove oil, geranium oil, and peppermint oil; or
 b) clove oil, thyme oil, and citronella oil.

In yet another version of the above advantageous embodiment, the active component may consist essentially of clove oil, geranium oil, and peppermint oil.

In still another embodiment, the water-based composition may include (i) active component, (ii) fixative, (iii) solubilizer, (iv) carrier, (v) emulsifier, and (vi) thickener, each of which may be present in any amount suitable, and more specifically may be present in any of the amounts discussed for each component above.

In a particularly advantageous embodiment, a water-based composition may comprise:
 i. from about 2.5 wt. % to about 15 wt. % of an active component;
 ii. from about 1 wt. % to about 15 wt. % of a fixative;
 iii. from about 3 wt. % to about 20 wt. % of a solubilizer;
 iv. from about 60 wt. % to about 85 wt. % of a carrier;
 v. from about 0.1 wt. % to about 7.5 wt. % of an emulsifier; and
 vi. from about 0.1 wt. % to about 5.0 wt. % of a thickener.

In a particular version of the above advantageous embodiment, the active component may consist essentially of:
 a) from about 0.1 wt. % to about 5.0 wt. % of clove oil;
 b) from about 0.5 wt. % to about 15.0 wt. % of geranium oil; and
 c) from about 0.1 wt. % to about 15.0 wt. % of peppermint oil.

In another version of the above advantageous embodiment, the active component may consist essentially of:
 a) at least one essential oil selected from the group consisting of clove oil, geraniol, and lemongrass oil; and
 b) at least two essential oils selected from the group consisting of peppermint oil, geranium oil, thyme oil, citronella oil, and eugenol.

In still another version of the above advantageous embodiment, the active component may consist essentially of:
 a) clove oil, geranium oil, and peppermint oil; or
 b) clove oil, thyme oil, and citronella oil.

In yet another version of the above advantageous embodiment, the active component may consist essentially of clove oil, geranium oil, and peppermint oil.

In another advantageous embodiment, a water-based composition may comprise:
 i. from about 8 wt. % to about 12 wt. % of an active component consisting of:
  a) from about 0.1 wt. % to about 1.0 wt. % of clove oil;
  b) from about 4.5 wt. % to about 7.5 wt. % of geranium oil; and
  c) from about 3.0 wt. % to about 6.0 wt. % of peppermint oil;
 ii. from about 5 wt. % to about 10 wt. % of a fixative that includes vanillin;
 iii. from about 5 wt. % to about 15 wt. % of a solubilizer that includes isopropyl alcohol;
 iv. from about 60 wt. % to about 80 wt. % of a carrier that includes water;
 v. from about 0.5 wt. % to about 1.5 wt. % of an emulsifier that includes at least one of, or a combination of both, a *Quillaja saponin* and a polyglyceryl oleate; and
 vi. from about 0.1 wt. % to about 1.0 wt. % of a thickener that includes microcrystalline cellulose.

In a particular version of the above advantageous embodiment, the active component may consist essentially of:
 a) from about 0.1 wt. % to about 5.0 wt. % of clove oil;
 b) from about 0.5 wt. % to about 15.0 wt. % of geranium oil; and
 c) from about 0.1 wt. % to about 15.0 wt. % of peppermint oil.

In another version of the above advantageous embodiment, the active component may consist essentially of:
 a) at least one essential oil selected from the group consisting of clove oil, geraniol, and lemongrass oil; and
 b) at least two essential oils selected from the group consisting of peppermint oil, geranium oil, thyme oil, citronella oil, and eugenol.

In still another version of the above advantageous embodiment, the active component may consist essentially of:
 a) clove oil, geranium oil, and peppermint oil; or
 b) clove oil, thyme oil, and citronella oil.

In yet another version of the above advantageous embodiment, the active component may consist essentially of clove oil, geranium oil, and peppermint oil.

Process for Forming a Water-Based Insect Repellent Composition

A water-based insect repellent composition including sufficient concentrations of essential oils can be difficult to prepare and may be particularly difficult to prepare as a homogeneous and stable repellent composition. Without wishing to be bound by any theory, this may be because of the inherent difficulty involved in stably mixing non-polar components such as oils (for example, essential oils and/or mineral oil) and polar components such as water.

As used herein, the term homogenizing refers to a process involving combining individual components that could not be mixed into a homogeneous, stable mixture via standard stirring and heating processes. In a specific embodiment, homogenizing refers to a mixing process that uses a tool such as a homogenizer or an immersion blender. Non-limiting examples of a homogenizer include a Polytron PT 10-35 GT or similar lab homogenizers sold by companies such as Ultra Turrax.

An advantageous method for producing a water-based insect repellent composition may include homogenizing mixtures comprising water, a thickener, a first emulsifier, an active component that includes at least one essential oil, a first fixative, a second emulsifier, a second fixative, and a solubilizer, and homogenizing the mixtures until a homogenous water-based insect repellent composition is formed.

In one specific and particularly advantageous embodiment, a process to form a water-based insect repellent composition includes homogenizing mixtures comprising a thickener (for example, a microcrystalline cellulose/cellulose gum blend), a carrier (for example water, such as deionized water), a first emulsifier (such as a polyglycerol oleate or a *Quillaja* saponin), an active component that includes at least three essential oils (for example an active component that consists of a combination of clove oil, geranium oil, and peppermint oil), a first fixative (such as triethyl citrate), a second emulsifier (such a s polyglyceryl oleate), a second fixative (such as vanillin), and a solubilizer (such as isopropyl alcohol).

In certain embodiments, the active component used in a process to form a water-based insect repellent composition may comprise at least three of the following essential oils: clove oil, peppermint oil, geranium oil, thyme oil, citronella oil, geraniol, lemongrass oil, and eugenol. In particular embodiments, the active component may consist essentially of clove oil, geranium oil, and peppermint oil.

The emulsifier used in a process to form a water-based insect repellent composition may be selected from the group consisting of saponins, glycerin aliphatic acid esters, gum arabic, mustard, lecithin, carrageenan, guar gum, monoglycerides, diglycerides, polysorbates, glyceryl ethers, alkyl sulfate anionic surfactants, alkyl ether sulfate anionic surfactants, and any combination thereof. The emulsifier may be present in an amount from about 0.5 wt. % to about 1.5 wt. % wherein all weight percentages are percent by weight of the total composition. In particular embodiments, the emulsifier may be a plant-based emulsifier such as a *Quillaja saponin* and/or a polyglyceryl oleate.

The thickener used in a process to form a water-based insect repellent composition may be selected from the group consisting of cellulose derivatives, gums, pectin, carrageenan, starch, bentonite, and combinations thereof. The thickener may be present in an amount from about 0.1 wt. % to about 5.0 wt. % or from about 0.1 wt. % to about 1.0 wt. %, wherein all weight percentages are percent by weight of the total composition. In particular embodiments, the thickener may be microcrystalline cellulose.

The fixative used in a process to form a water-based insect repellent composition may be selected from the group consisting of vanillin, esters of organic acids, fumed silica, alkoxylated alcohols, glycol ethers, glycerin aliphatic acid esters, polyethylene glycol, and any combination thereof.

The solubilizer used in a process to form a water-based insect repellent composition may be selected from the group consisting of $C_1$-$C_8$ alcohols, hydrogenated oils, polyethoxylated oils, alkoxylated alcohols, alkylene glycols, glycol ethers, and any combination thereof.

EXAMPLES

The following Examples are provided to demonstrate and further illustrate certain embodiments and aspects of the present disclosure and are not to be construed as limiting the scope of the disclosure.

Test Methods

1. The Insect Repellency Test

Efficacy, Duration, and Percent Repellency: The primary method used to assess the efficacy and duration of an insect repellent is the "Arm-in-Cage Test". The term "duration" as used herein refers to the time between (1) the application of the insect repellent composition and (2) when the subject first drops below the applicable minimum percent repellency threshold. For all of the testing methodologies used herein, the minimum threshold value for "percent repellency" at which the measurement for duration is cutoff is at least ($\geq$) 90% repellency. For some testing methodologies used herein (such as the "Arm-in-Cage Test"), the minimum threshold value for "percent repellency" was 90% repellency. For other testing methodologies used herein (such as the "K & D Module Repellency Test"), the minimum threshold value for percent repellency was 100% repellency. When a duration is measured using a minimum threshold of 100% repellency, the duration may also be referred to as "Complete Protection Time" (CPT).

The percent repellency value of a given repellent composition is calculated at each exposure period. The "duration" was calculated using the Kaplan-Meier survival analysis for the last time (in hours) that the test subject's treated arms gave at least the minimum threshold value for "percent repellency" (for example, at least ($\geq$) 90% repellency). At each exposure period, the percent repellency for a test subject's treated arm was calculated using the control count from the test subject's untreated arm. The following formula was used to calculate the percent repellency for each exposure period during the test:

Ux=Landing count from a 1 minute exposure of the test subject's untreated arm to the test system at time X Tx=Landing count from a 1 minute exposure of the test subject's treated arm to the test system at time X $$(1-(T_x/U_x))*100=\text{Percent repellency at time } X$$

Arm-and-Cage Test

Preparation of Test System: For the Arm-in-Cage Test used herein, mosquitoes initially reared in an insectary were moved via rearing cage into the laboratory. Approximately 100 female mosquitoes were removed from rearing cages and placed in test cage using the Posey and Schreck method (Ref. Posey and Schreck—Mosquito News 1981-see Appendix) with the following exceptions:

The airflow apparatus was 54.5 cm long×42.0 cm high× 40.5 cm wide.

There was not a door at the front of the airflow apparatus, instead the bottom was open, and the airflow apparatus could be placed over the rearing cage. Both were placed on the top of a counter.

The Plexiglas cylinder (trap) was 31 cm long and 10 cm wide diameter.

The mesh screen in the cylinder trap was Dacron marquisette mesh not aluminum screening.

There was no Plexiglas cradle. The cylinder trap was held in place.

The fan attached to the back of the airflow apparatus is a Comair Rotron fan—Model #PT283. It was powered by a Powerstat Variable Autotransformer—Type #3PN116C. The Powerstat controlled the air flow rate and is set at 50.

Two cages of the of test system were set up for the test day. The test subjects were split into two groups and each group was assigned to one of the test cages. More than one test cage of the test system was used to reduce exhausting the mosquitoes by exposing them to too many test subjects. Test cages were placed in the test laboratory.

Preparation and Treatment of Test Subjects: The exposed skin of each test subject was cleaned as follows: Test subjects (a.) washed their forearms with non-scented soap and water; (b.) rinsed their arms with water; (c.) dried their arms with a paper towel; (d.) wiped their forearms with 70% ethanol solution or Isopropyl Alcohol; and (e.) air dried their forearms. After cleaning, a treatment area was defined on each test subject's treatment arm by wrapping the wrist and elbow with a layer of athletic tape. Medical tape was placed over the athletic tape to prevent mosquitoes from biting through the athletic tape. Next, for each arm, the surface area (sq. cm) of test subject's arm, from wrist to elbow, was calculated as follows: (1.) The circumference of the arm (in cm) was measured at the wrist, at just below the elbow, and two equally spaced points in between. The total of these circumference measurements was divided by 4 to determine (C); (2.) Length (cm) of arm from wrist to elbow (D) was measured; and (3.) The result of C was multiplied by the result of D. The amount of repellent needed for each sample was determined as follows; (a.) Application rate of 2 grams per 600 cm2 (3.34 mg/cm$^2$) of test substance was used for testing. (b.) To use the 2 gram per 600 cm2 application rate, the surface area (cm$^2$) of the arm was divided by 600 (cm$^2$), and then multiplied by 2 to calculate the application amount in grams. (c.) The resulting quantity was applied to the test subject's taped treatment arm. The sample was then placed on a tared balance. The targeted calculated amount (by weight) of repellent was removed from the sample container with a pipette. The actual amount applied, and the target amount were recorded. Two gloved fingers were used to further spread the repellent evenly over the forearm. After treatment, the test subjects were instructed to avoid abrasion or contamination of the treated areas, or exertion causing unnecessary perspiration or body temperature change.

Laboratory Procedure: Directly before arm exposure, the test subjects put on gloves so that the cuff slightly overlap. The test subject exposed their untreated arm to insects by inserting the arm into the cage through the sleeve until the sleeve bunched around the elbow and slightly overlapped the treated area of the forearm at the elbow. Each test subject exposed their untreated arm to the test system for 1 minute. The test subjects were allowed to shake their arm to remove the test system to avoid any biting. The same insect was counted more than once if it was shaken off and then re-landed. The test subject then exposed their treated arm to the test system for 1 minute and the number of insect lands was counted. Repellency relative to the control was calculated at each time point. The first exposure began 30 minutes post treatment. The second exposure began 60 minutes post treatment. After the second exposure, exposures were repeated every 60 minutes until the test was terminated. The test was terminated when repellency fell below 90% compared to the test subjects untreated arm.

K & D Module Repellency Test

Another method that may be used to assess the insect repellent efficacy of an insect repellent composition is the "K & D Module Repellency Test." The insect repellent efficacy is measured using a minimum repellency threshold of 100% repellency, which may also be referred to as the Complete Protection Time (CPT) of an insect repellent composition, which is the time period between the application of the insect repellent composition and the first insect landing. The "K & D Module Repellency Test" uses a six cell K & D Module as shown in FIG. 14.1, and described in Jerome A. Klun and Matt Kramer, "Klun & Debboun Modules: Uses and Data Analysis", *Insect Repellents Handbook*, Second Edition, edited by Mustapha Debboun et al., CRC Press, 2014, pages 267-281, which is incorporated herein by reference as if set forth in its entirety.

In the K & D Module Repellency Test the test volunteer used a marker and a template, representing the base and the 3 cm.×4 cm. openings of the K & D module, to mark skin areas of his/her arm which were then treated with different insect repellent compositions at a skin dose of 0.0017 grams/cm$^2$ against the insect (in this case, *Culex quinquefasciatus*). The rectangular marks on the volunteer's arm represented where the six cells of the K & D module were positioned on the volunteer's arm. Each cell of the K & D module was filled with ten mated female mosquitoes (*Culex quinquefasciatus*), and the floor slide was removed from each cell to expose all mosquitoes to all skin treatments. The time between removing the floor slide of each cell and the first mosquito from the cell landing is recorded as the CPT.

Results

The formulation development process began with an initial list of approximately 170 different essential oils each potentially possessing some form of insect behavior-modifying activity. This initial list of approximately 170 essential oils was then down-selected to 16 essential oils based upon mode of action and other factors.

Bioefficacy testing was conducted on the 16 oils (neat, or in spray/lotion forms) using a method to simulate a skin substrate for testing of insect repellents, as described in U.S. Patent Application Publication No. 2018/0014513, which is incorporated in its entirety herein by reference.

Based on the results of the bio efficacy testing, eight oils were identified for further exploration and development based upon their repellent efficacy and/or duration, with a target repellency duration of at least 2.5 hours. The eight essential oils identified included Thyme Oil, Citronella Oil, Clove Oil, Geraniol, Eugenol, Peppermint Oil, Lemongrass Oil, and Geranium Oil.

A cursory toxicology analysis was performed on each of these eight essential oils to quantify essential oil concentration maximums for screening purposes. In brief, a quantitative risk assessment, following standards set both internally and by the U.S. EPA Standard Operating Procedures for Residential Pesticide Exposure Assessment, was conducted to determine the maximum inclusion level (%) that may potentiate sensitization from these essential oils. The assessment was based on both public and internal data relating to the oils, the commonly found constituents of the oils, and the overlap of constituents between essential oil active ingredients. Of note, this assessment was predicated on the available analytical data for commonly used varieties of these essential oils. Given the inherent variability within the composition of essential oils, the assessment herein is subject to change dependent on validated composition of each oil. Critically, this analysis informed maximum inclusion levels of essential oil content for the insect repellent formulation. These ranges are non-obvious because the ranges cannot be determined by standard methods, such as randomly choosing and testing a variable number, combination, and concentration of oils, involving arbitrary selection and testing of various formulations, due to prohibitions of performing such tests, especially on human and animal subjects.

Following the identification of maximum inclusion levels for potential essential oil concentrations by toxicology analysis, it was necessary to establish the baseline repellency (i.e., the insect repellency duration, as described above) of the essential oil packages absent additional functional components. These "essential oil only" packages are also referred to as "active packages." Numerous different combinations of essential oils, as well as combinations of different essential oil concentrations, that were evaluated as active packages using the "K & D Module Repellency Test" are shown in Table 1 and Table 2 below.

TABLE 1

|  | Geranoil | Eugenol | Peppermint | Geranium | Citronella | Thyme | Lemongrass | Clovebud |
|---|---|---|---|---|---|---|---|---|
| Geraniol | o |  |  |  |  |  |  |  |
| Eugenol | x | o |  |  |  |  |  |  |
| Peppermint | x | x | o |  |  |  | w | Thyme or Geranium |
| Geranium | x | x | x | o |  |  |  |  |
| Citronella | x | x | x | x | o |  | w | Thyme or Geranium |
| Thyme | x | x | x | x | x | o |  |  |

TABLE 1-continued

|  | Geranoil | Eugenol | Peppermint | Geranium | Citronella | Thyme | Lemongrass | Clovebud |  |
|---|---|---|---|---|---|---|---|---|---|
| Lemongrass | x | x | x | x | x | x | o | w | Thyme or Geranium |
| Clovebud | x | x | x | x | x | x | x | o |  |

"o" = Single oil

"x" = Two Oil Combination

"w" = Three Oil Combination

TABLE 2

| Sample No. | Active Package Identifier | Sample (in water/isopropanol) | Avg Duration (Min) | Avg Duration (Hours) | Duration (Min) (Time of confirmation land) Subject 1 | Subject 2 | Subject 3 | Subject 4 |
|---|---|---|---|---|---|---|---|---|
| IE1 | AP1 | 0.5% clove oil<br>3.5% thyme oil<br>5% citronella | 180 | 3.0 | 180 | 180 | 180 | 180 |
| IE2 | AP2 | 0.5% clove oil<br>6.5% geranium oil<br>4.5% peppermint oil | 160 | 2.7 | 180 | 150 | 150 | N/A |
| CE1 | AP3 | 5% citronella oil<br>0.7% lemongrass oil | 150 | 2.5 | 150 | 120 | 180 | N/A |
| CE2 | AP4 | 5% peppermint oil<br>5% geranium oil | 140 | 2.3 | 150 | 180 | 90 | N/A |
| CE3 | AP5 | 0.7% lemongrass oil<br>6.5% geranium oil | 140 | 2.3 | 180 | 150 | 90 | N/A |
| CE4 | AP6 | 3.5% thyme oil<br>3% eugenol | 140 | 2.3 | 150 | 150 | 120 | N/A |
| CE5 | AP7 | 3.5% thyme oil<br>6.5% geranium oil | 130 | 2.2 | 120 | 120 | 150 | N/A |
| CE6 | AP8 | 3.5% thyme oil<br>5% citronella oil | 130 | 2.2 | 150 | 120 | 120 | N/A |
| CE7 | AP9 | 0.5% clove bud oil<br>6.5% geranium oil<br>0.7% lemongrass oil | 120 | 2.0 | 120 | 120 | 120 | N/A |
| CE8 | AP10 | 5% citronella oil<br>3.5% geraniol | 120 | 2.0 | 90 | 120 | 150 | N/A |
| CE9 | AP11 | 5% peppermint oil<br>3% eugenol | 120 | 2.0 | 120 | 120 | 120 | N/A |
| CE10 | AP12 | 3.5% thyme oil<br>5% peppermint oil | 120 | 2.0 | 120 | 150 | 90 | N/A |
| CE11 | AP13 | 6.5% geranium oil<br>1.5% geraniol | 120 | 2.0 | 60 | 180 | 120 | 120 |
| CE12 | AP14 | 0.5% clove bud oil<br>3.5% thyme oil<br>0.7% lemongrass oil | 110 | 1.8 | 90 | 120 | 120 | N/A |
| CE13 | AP15 | 3.5% thyme oil<br>5% geraniol | 100 | 1.7 | 90 | 60 | 150 | N/A |
| CE14 | AP16 | 5% citronella oil<br>5% geranium oil | 100 | 1.7 | 60 | 120 | 120 | N/A |
| CE15 | AP17 | 10% peppermint oil | 100 | 1.7 | 150 | 120 | 30 | N/A |
| CE16 | AP18 | 6.5% geranium oil<br>3% eugenol | 100 | 1.7 | 120 | 90 | 90 | 100 |
| CE17 | AP19 | 3% eugenol | 100 | 1.7 | 60 | 120 | 120 | 100 |
| CE18 | AP20 | 5% citronella oil<br>0.5% clove bud oil | 90 | 1.5 | 150 | 90 | 30 |  |
| CE19 | AP21 | 3.5% thyme oil | 90 | 1.5 | 90 | 120 | 60 | N/A |
| CE20 | AP22 | 0.7% lemongrass oil<br>5% geraniol | 90 | 1.5 | 90 | 120 | 60 | N/A |
| CE21(a) | AP23 | 0.5% clove bud oil<br>3.5% thyme oil<br>0.7% lemongrass oil | 90 | 1.5 | 90 | 90 | 90 | 90 |
| CE21(b) | AP24 | 0.5% clove bud oil<br>3.5% thyme oil<br>5% peppermint oil | 80 | 1.3 | 120 | 60 | 60 | 80 |
| CE22 | AP25 | 0.7% lemongrass oil | 80 | 1.3 | 90 | 90 | 60 | N/A |
| CE23 | AP26 | 10% citronella oil | 75 | 1.3 | 120 | 30 | N/A | N/A |
| CE24 | AP27 | 5% peppermint oil<br>5% geraniol | 70 | 1.2 | 90 | 90 | 30 | N/A |
| CE25 | AP28 | 0.5% clove bud oil<br>0.7% lemongrass oil | 70 | 1.2 | 120 | 30 | 60 | N/A |
| CE26 | AP29 | 0.5% clove bud oil<br>5% geraniol | 70 | 1.2 | 60 | 90 | 60 | N/A |
| CE27 | AP30 | 5% citronella oil<br>5% peppermint oil | 70 | 1.2 | 60 | 120 | 30 | N/A |

TABLE 2-continued

| Sample No. | Active Package Identifier | Sample (in water/isopropanol) | Avg Duration (Min) | Avg Duration (Hours) | Duration (Min) (Time of confirmation land) | | | |
|---|---|---|---|---|---|---|---|---|
| | | | | | Subject 1 | Subject 2 | Subject 3 | Subject 4 |
| CE28 | AP31 | 3.5% Thyme 0.7% Lemongrass oil | 66 | 1.1 | 60 | 60 | 60 | 90 |
| CE29 | AP32 | 3.5% Thyme oil 0.5% clove bud oil | 66 | 1.1 | 60 | 30 | 90 | 90 |
| CE30 | AP33 | 10% geranium oil | 60 | 1 | 60 | 60 | N/A | N/A |
| CE31 | AP34 | 0.7% lemongrass oil 5% peppermint oil | 60 | 1 | 90 | 30 | N/A | N/A |
| CE32 | AP35 | 0.5% clove bud oil 6.5% geranium oil | 60 | 1 | 60 | 60 | 60 | N/A |
| CE33 | AP36 | 5% citronella oil 3% eugenol | 50 | 0.8 | 90 | 30 | 30 | 50 |
| CE34 | AP37 | 0.5% clove bud oil 2.5% eugenol | 50 | 0.8 | 60 | 60 | 30 | N/A |
| CE35 | AP38 | 5% geraniol 3% eugenol | 50 | 0.8 | 30 | 90 | 30 | N/A |
| CE36 | AP38 | 6% geraniol | 50 | 0.8 | 30 | 60 | 60 | N/A |
| CE37 | AP39 | 0.5% clove bud oil 5% peppermint oil | 50 | 0.8 | 30 | 60 | 60 | |
| CE38 | AP40 | 0.7% lemongrass oil 3% eugenol | 45 | 0.8 | 60 | 30 | | |
| CE39 | AP41 | 0.5% clove bud oil | 40 | 0.7 | 60 | 30 | 30 | |

As can be seen from Table 2, two active packages IE1/AP1 and IE2/AP2, were found to provide surprisingly long durations, specifically durations greater than 2.5 hours (i.e. greater than 150 minutes). For the results shown in Table 2, duration was defined using the 100% repellency threshold (i.e. complete protection time (CPT)). The surprisingly long durations of these active packages make them particularly beneficial for use in insect repellent formulations, where minimizing the number of re-applications by maximizing effective duration is important to consumers and a key market differentiator.

As a result of its surprisingly long duration, in combination with other beneficial qualities, actives package IE2 was selected for incorporation in various layered technologies (further described below) that are part of the present insect repellent formulations. One reason IE2 was selected for initial incorporation in the layered technologies and insect repellent formulations above IE1 was due to certain properties such as, but not limited to, fragrance and skin-feel of IE2 being considered more favorable over the corresponding properties of IE1.

The actives package IE2 was incorporated into different formulations that included certain layered technologies, as shown below in Table 3. The formulation ingredients work synergistically with the particular oils in the inventive actives package(s) (e.g. IE1/AP1 and IE2/AP2) to effectively reduce the evaporation of the essential oil active package from a subject's skin, thereby increasing bioavailability of the oils, and repellency duration, against *Culex* mosquitoes. The formulations were designed with a technology-layer system. The particular essential oils within the inventive active package(s) of the inventive formulation interact with a duration-extending technology, which is then referred to as a technology-layer. The technology-layers build upon each other using different mechanisms to slow the evaporation of the essential oils from the skin. Two examples of such layered technology formulations are Inventive Formulation 1 and Inventive Formulation 2 (IF1 and IF2), each of which includes IE2/AP2 as an actives package, are shown in Table 3. The concentration of each component in the formulations is listed as a weight percentage (wt. %), based on the total weight of the entire formulation.

TABLE 3

| Raw Materials | CAS Number | Function | Inventive Formulation 1 (IF1) | Inventive Formulation 2 (IF2) |
|---|---|---|---|---|
| Clove Oil | 8000-34-8 | Active Ingredient | 0.5 | 0.5 |
| Geranium Oil | 8000-46-2 | Active Ingredient | 5 | 5 |
| Peppermint Oil | 68917-18-0 | Active Ingredient | 4.5 | 4.5 |
| Vanillin | 121-33-5 | Fixative | 5 | 5 |
| Isopropyl Alcohol | 67-63-0 | Solubilizer | 10 | 10 |
| Quillaja Saponin | 1393-03-9 | Co-emulsifier | 0.64 | |
| Triethyl Citrate | 77-93-0 | Fixative | 5 | 5 |
| Polyglyceryl Oleate | 9007-48-1 | Co-emulsifier | 0.36 | 1.0 |
| Microcrystalline Cellulose | 9004-34-6; 9004-32-4 | Stabilizer, Thickener | 1 | 1 |
| Water | | Carrier | 68 | 68 |
| Fumed Silica | 112945-52-5 | Fixative | | |
| Mineral Oil | 8042-47-5 | Emollient | | |
| Lauric Acid | 143-07-7 | Emollient | | |
| Glycerin | 56-81-5 | Humectant, Plasticizer | | |
| Hydroxypropyl Methylcellulose | 9004-65-3 | Bio-Film Former | | |

Inventive Formulation 1—The essential oils are emulsified, deemed technology-layer 1. A bio-polymer-based stabilizer is used in the continuous phase (water) to thicken the water film to slow diffusion of the essential oils across the water film, deemed technology-layer 2. An emulsification system including *Quillaja* Saponin and polyglycerol oleate is included in technology layer 2. Two fixatives are added to the formula (vanillin and triethyl citrate) which help anchor the essential oils to the skin, deemed technology-layer 3.

Inventive Formulation 2—The essential oils are emulsified, deemed technology-layer 1. A biopolymer based stabilizer is used in the continuous phase (water) to thicken the water film to slow diffusion of the essential oils across the water film, deemed technology layer 2. An emulsification system including polyglycerol oleate is included in technology layer 2. Two fixatives are added to the formula (vanillin and triethyl citrate) which will help to anchor the essential oils to the skin, deemed technology layer 3.

The effective duration, defined using the 100% repellency threshold (i.e. as CPT), for each layered technology formulation was evaluated using the K & D Module Repellency Test.

The results of these tests are shown below in Tables 5 and 6 below.

TABLE 4

| Sample No. | Actives Package Identifier | Avg Duration (Min) | Avg Duration (Hours) | Duration (Minutes) Time of confirmation land Subject 1 | Subject 2 | Subject 3 | Layered Technologies |
|---|---|---|---|---|---|---|---|
| IF1 | AP2 | 480+ | 8+ | * | * | * | Emulsion-Based w/Vanillin & Triethyl Citrate |
| CF1 | AP2 | 350 | 5.8 | 5.5 hrs | 4 hrs | 8 hrs | Emulsion-Based with Film Former |
| CF2 | AP1 | 430 | 7.2 | 390 | 420 | 480 | Mineral Oil-Based w/Silica & Vanillin |
| CF3 | AP1 | 390 | 6.5 | 330 | 390 | 450 | Emulsion-Based w/HPMC (Film Former) & Vanillin |
| CF4 | AP1 | 380 | 6.3 | 420 | 270 | 450 | Mineral Oil-Based w/Triethyl Citrate, Lauric Acid & Vanillin |
| CF5 | AP1 | 340 | 5.7 | 300 | 330 | 390 | Emulsion-Based w/Vanillin & Triethyl Citrate |
| CF6 | AP1 | 330 | 5.5 | 300 | 330 | 360 | Emulsion-Based w/Vanillin, Triethyl Citrate & Silica |
| CF7 | AP1 | 330 | 5.5 | 270 | 330 | 390 | Liquid Coconut Oil-Based w/Vanillin |
| CF8 | AP1 | 280 | 4.7 | 210 | 360 | 270 | Mineral Oil-Based w/Lauric Acid |
| CF9 | AP1 | 260 | 4.3 | 270 | 270 | 240 | Mineral Oil-Based w/Paraffin Wax (Film Former) |
| CF10 | AP1 | 260 | 4.3 | 150 | 270 | 360 | Emulsion-Based w/HPMC (Film Former), Vanillin & Silica |
| CF11 | AP1 | 250 | 4.2 | 150 | 210 | 390 | Liquid Coconut Oil-Based |
| CF12 | AP1 | 230 | 3.8 | 210 | 150 | 330 | Mineral-Oil Based w/Silica |
| CF12(b) | 6% Geraniol | 220 | 3.7 | 150 | 210 | 300 | Mineral-Oil Based w/β-Cyclodextrin Encapsulated Geraniol |
| CF13 | AP1 | 210 | 3.5 | 150 | 330 | 150 | Water-Based w/Vanillin |
| CF14 | AP1 | 200 | 3.3 | 270 | 210 | 120 | Water-Based w/HPMC (Film-Former) |
| CF15 | AP1 | 190 | 3.2 | 120 | 210 | 240 | Emulsion-Based |
| CF16 | AP1 | 170 | 2.8 | 150 | 210 | 150 | Emulsion-Based w/Silica |
| CF17 | AP1 | 160 | 2.7 | 150 | 180 | 150 | Emulsion-Based w/Triethyl Citrate |
| CF18 | AP1 | 150 | 2.5 | 90 | 180 | 180 | Mineral-Oil Based |

* AP1 - 0.5% Clove bud + 3.5% Thyme + 5% Citronella  AP2 - 0.5% Clove bud + 5% Geranium + 4.5% Peppermint

*Repellent IF1 did not experience a failure by 8 hours. At that point the test subjects were released from the protocol, even though the repellent was still successfully performing past the 8-hour time point.

The formulation of each layered technology used in the examples above is as follows (all amounts are provided as w/w in percentages (%)):

|  | Raw Materials | Function | Concentration (w/w in %) |
|---|---|---|---|
| Formula CF1 | Clovebud Oil | Active Ingredient | 0.5 |
|  | Geranium Oil | Active Ingredient | 5 |
|  | Peppermint Oil | Active Ingredient | 4.5 |
|  | Vanillin | Fixative | 5 |
|  | Isopropyl Alcohol | Solubilizer | 10 |
|  | Quillaja Saponin | Fixative | 0.64 |
|  | Glycerin | Humectant | 2 |
|  | Hydroxypropyl Methylcellulose | Film Former | 2 |
|  | Polyglyceryl Oleate | Co-Emulsifier | 0.36 |
|  | Isopropyl Myristate | Emollient | 2 |
|  | Water | Carrier | 70 |
| Formula CF15 | Clovebud Oil | Active Ingredient | 0.5 |
|  | Thyme Oil | Active Ingredient | 3.5 |
|  | Citronella Oil | Active Ingredient | 5 |
|  | Quillaja Saponin | Co-Emulsifier | 0.64 |
|  | Polyglyceryl Oleate | Co-Emulsifier | 0.36 |
|  | Isopropyl Myristate | Emollient | 2 |
|  | Water | Carrier | 88 |
| Formula CF5 | Clovebud Oil | Active Ingredient | 0.5 |
|  | Thyme Oil | Active Ingredient | 3.5 |
|  | Citronella Oil | Active Ingredient | 5 |
|  | Quillaja Saponin | Co-Emulsifier | 0.64 |
|  | Isopropyl Alcohol | Solubilizer | 10 |
|  | Polyglyceryl Oleate | Co-Emulsifier | 0.36 |
|  | Vanillin | Fixative | 5 |

-continued

|  | Raw Materials | Function | Concentration (w/w in %) |
|---|---|---|---|
|  | Triethyl Citrate | Fixative | 5 |
|  | Microcrystalline Cellulose/Cellulose Gum | Thickener/Stabilizer | 1 |
|  | Water | Carrier | 69 |
| Formula CF6 | Clovebud Oil | Active Ingredient | 0.5 |
|  | Thyme Oil | Active Ingredient | 3.5 |
|  | Citronella Oil | Active Ingredient | 5 |
|  | Fumed Silica | Fixative | 2 |
|  | Isopropyl Myristate | Emollient | 2 |
|  | Glycerin | Humectant | 1 |
|  | Quillaja Saponin | Co-Emulsifier | 0.64 |
|  | Vanillin | Fixative | 5 |
|  | Polyglyceryl Oleate | Co-Emulsifier | 0.36 |
|  | Microcrystalline Cellulose/Cellulose Gum | Thickener/Stabilizer | 1 |
|  | Isopropyl Alcohol | Solubilizer | 10 |
|  | Triethyl Citrate | Fixative | 5 |
|  | Water | Carrier | 64 |
| Formula CF14 | Clovebud Oil | Active Ingredient | 0.5 |
|  | Thyme Oil | Active Ingredient | 3.5 |
|  | Citronella Oil | Active Ingredient | 5 |
|  | Hydroxypropyl Methylcellulose | Bio-Film Former | 2 |
|  | Glycerin | Humectant | 2 |
|  | Isopropyl Alcohol | Solubilizer | 42 |
|  | Water | Carrier | 45 |
| Formula CF18 | Clovebud Oil | Active Ingredient | 0.5 |
|  | Thyme Oil | Active Ingredient | 3.5 |
|  | Citronella Oil | Active Ingredient | 5 |
|  | Isopropyl Myristate | Emollient | 11 |
|  | Mineral Oil | Emollient | 80 |
| Formula CF9 | Clovebud Oil | Active Ingredient | 0.5 |
|  | Thyme Oil | Active Ingredient | 3.5 |
|  | Citronella Oil | Active Ingredient | 5 |
|  | Isopropyl Myristate | Emollient | 9 |
|  | Mineral Oil | Emollient | 80 |
|  | Paraffin Wax | Film Former | 2 |
| Formula CF8 | Clovebud Oil | Active Ingredient | 0.5 |
|  | Thyme Oil | Active Ingredient | 3.5 |
|  | Citronella Oil | Active Ingredient | 5 |
|  | Mineral Oil | Emollient | 48.5 |
|  | Lauric Acid | Solubilizer | 6.5 |
|  | Isopropyl Alcohol | Solubilizer | 36 |
| Formula CF12 | Clovebud Oil | Active Ingredient | 0.5 |
|  | Thyme Oil | Active Ingredient | 3.5 |
|  | Citronella Oil | Active Ingredient | 5 |
|  | Mineral Oil | Emollient | 80 |
|  | Isopropyl Myristate | Emollient | 9 |
|  | Fumed Silica | Fixative | 2 |
| Formula CF11 | Clovebud Oil | Active Ingredient | 0.5 |
|  | Thyme Oil | Active Ingredient | 3.5 |
|  | Citronella Oil | Active Ingredient | 5 |
|  | MCT Oil | Emollient | 91 |
| Formula CF13 | Clovebud Oil | Active Ingredient | 0.5 |
|  | Thyme Oil | Active Ingredient | 3.5 |
|  | Citronella Oil | Active Ingredient | 5 |
|  | Vanillin | Fixative | 5 |
|  | Isopropyl Alcohol | Solubilizer | 40 |
|  | Water | Carrier | 46 |
| Foruma CF 12(b) | Geraniol | Active Ingredient | 4 |
|  | Geraniol Encapsulated in Beta-Cyclodextrin | Active Ingredient | 20 |
|  | Mineral Oil | Emollient | 76 |
| Formula CF16 | Clovebud Oil | Active Ingredient | 0.5 |
|  | Thyme Oil | Active Ingredient | 3.5 |
|  | Citronella Oil | Active Ingredient | 5 |
|  | Silica | Fixative | 2 |
|  | Microcrystalline Cellulose/Cellulose Gum | Thickener/Stabilizer | 1 |
|  | Isopropyl Myristate | Emollient | 2 |
|  | Polyglyceryl Oleate | Co-Emulsifier | 0.36 |
|  | Quillaja Saponin | Co-Emulsifier | 0.64 |
|  | Water | Carrier | 85 |
| Formula CF7 | Clovebud Oil | Active Ingredient | 0.5 |
|  | Thyme Oil | Active Ingredient | 3.5 |
|  | Citronella Oil | Active Ingredient | 5 |
|  | MCT Oil | Emollient | 50 |
|  | Vanilla | Fixative | 5 |
|  | Isopropyl Alcohol | Solubilizer | 36 |
| Formula CF2 | Clovebud Oil | Active Ingredient | 0.5 |
|  | Thyme Oil | Active Ingredient | 3.5 |
|  | Citronella Oil | Active Ingredient | 5 |

-continued

| | Raw Materials | Function | Concentration (w/w in %) |
|---|---|---|---|
| | Fumed Silica | Fixative | 2 |
| | Lauric Acid | Solubilizer | 6.5 |
| | Mineral Oil | Emollient | 47.5 |
| | Vanillan | Fixative | 5 |
| | Isopropyl Alcohol | Solubilizer | 30 |
| Formula CF4 | Clovebud Oil | Active Ingredient | 0.5 |
| | Thyme Oil | Active Ingredient | 3.5 |
| | Citronella Oil | Active Ingredient | 5 |
| | Vanillin | Fixative | 5 |
| | Mineral Oil | Emollient | 44.5 |
| | Isopropyl Alcohol | Solubilizer | 30 |
| | Triethyl Citrate | Fixative | 5 |
| | Lauric Acid | Solubilizer | 6.5 |
| Formula CF3 | Clovebud Oil | Active Ingredient | 0.5 |
| | Thyme Oil | Active Ingredient | 3.5 |
| | Citronella Oil | Active Ingredient | 5 |
| | Hydroxypropyl Methylcellulose | Film Former | 2 |
| | Vanillin | Fixative | 5 |
| | Glycerin | Humectant | 2 |
| | Quillaja Saponin | Co-Emulsifier | 0.64 |
| | Polyglyceryl Oleate | Co-Emulsifier | 0.36 |
| | Isopropyl Alcohol | Solubilizer | 10 |
| | Water | Carrier | 71 |
| Formula CF10 | Clovebud Oil | Active Ingredient | 0.5 |
| | Thyme Oil | Active Ingredient | 3.5 |
| | Citronella Oil | Active Ingredient | 5 |
| | Hydroxypropyl Methylcellulose | Film Former | 2 |
| | Silica | Fixative | 2 |
| | Vanillin | Fixative | 5 |
| | Glycerin | Humectant | 2 |
| | Quillaja Saponin | Co-Emulsifier | 0.64 |
| | Polyglyceryl Oleate | Co-Emulsifier | 0.36 |
| | Isopropyl Alcohol | Solubilizer | 10 |
| | Water | Carrier | 69 |
| Formula CF17 | Clovebud Oil | Active Ingredient | 0.5 |
| | Thyme Oil | Active Ingredient | 3.5 |
| | Citronella Oil | Active Ingredient | 5 |
| | Triethyl Citrate | Fixative | 5 |
| | Quillaja Saponin | Co-Emulsifier | 0.64 |
| | Polyglyceryl Oleate | Co-Emulsifier | 0.36 |
| | Water | Carrier | 85 |

TABLE 5

| Sample No. | Actives Package (EO's) | Avg Duration of Formulation (Min) | Avg Duration Formulation (Hours) | Avg Duration Actives (Essential Oil) Package Only | Duration (Minutes) *Time of confirmation land Subj. 1 | Subj. 2 | Subj. 3 | Ratio of Avg. Durations: Formulation/ Actives only |
|---|---|---|---|---|---|---|---|---|
| IF1 | IE2/AP2 | 480 | 8.0 | 2.7 | 480 | 480 | 480 | 2.963 |
| CF4 | IE1/AP1 | 340 | 5.7 | 3 | 300 | 330 | 390 | 1.9 |
| CF1 | IE1/AP1 | 430 | 7.2 | 3 | 390 | 420 | 480 | 2.4 |
| CF2 | IE1/AP1 | 390 | 6.5 | 3 | 330 | 390 | 450 | 2.16 |
| CF3 | IE1/AP1 | 380 | 6.3 | 3 | 420 | 270 | 450 | 2.1 |

AP1 - 0.5% Clove bud + 3.5% Thyme + 5% Citronella
AP2 - 0.5% Clove bud + 5% Geranium + 4.5% Peppermint As shown in Table 5 above, IF1 demonstrates surprisingly beneficial/long duration, along with good skin feel, as compared to the shorter duration of the comparative formulations. It is especially surprising that IF1 demonstrates significantly improved duration even when compared to CF1, which includes the same essential oils, same initial fixative, same solubilizer, same emulsifier, and the same co-emulsifier as IF1. Results shown in Table 5 are according to the K&D Module, using a 100% repellency threshold for duration measurements.

TABLE 6

| Sample No. | Active Package | Avg. Duration | Time where % repellency dropped below 90%* Subject 1 | Subject 2 | Subject 3 |
|---|---|---|---|---|---|
| CF1 | IE1/AP2 | 5.8 hrs | 5.5 hrs | 4 hrs | 8 hrs |
| CF19 | IE2/AP2 | 4.3 hrs | 5 hrs | 4 hrs | 4 hrs |
| CF20 | IE2/AP2 | 3.3 hrs | 2.5 hrs | 6 hrs | 1.5 hrs |

As can be seen from Tables 5 and 6, IF1 was found to have a surprisingly long duration, in particular a duration of greater than 8.0 hours (i.e. greater than 480 minutes), where duration is defined as complete protection time (CPT). Moreover, IF1 was also found to exhibit a surprisingly large improvement in duration time, as compared to the actives package alone. In particular, the ratio of the duration (CPT) of IF1 with respect to the duration (CPT) the actives package alone (AP2) was surprisingly found to be greater than 2.5 to 1. In fact, the addition of the layered technologies comprised in IF1 advantageously nearly tripled the duration (CPT) of the actives package (IE2/AP2) providing a 8-hour duration for IF1 compared to the 2.7-hour duration of IE2/AP2. The surprisingly long durations of formulation IF1, in combination with its other commercially desirable properties (such as fragrance and skin-feel) make formulation IF1 particularly beneficial for use in insect repellents.

The actives package IE2 was also incorporated into certain layered technologies to provide inventive formulation 2 (IF2), as shown above in Table 3. The formulation ingredients work synergistically to effectively slow the evaporation of the essential oils from a subject's skin, thereby increasing bioavailability of the oils, and repellency duration, against *Culex* mosquitoes. Similar to IF1, IF2 was designed with an inventive technology-layer system. Results shown in Table 6 are according to the Arm-in-Cage Test, using a 90% repellency threshold for duration measurements.

TABLE 7

| | | | (Arm & Cage) | | | | | | | | | | |
|---|---|---|---|---|---|---|---|---|---|---|---|---|---|
| Formulation No. | Active Package | Avg. Duration (Min) | Time where % repellency dropped below 90%* | | | | | | | | | | Ratio of Avg. Durations: Formulation/ Actives only |
| | | | 1 | 2 | 3 | 4 | 5 | 6 | 7 | 8 | 9 | 10 | |
| IF2 | IE2/AP2 | 7.5 | 3.8 | 8.0 | 7.0 | 8.0 | 7.0 | 8.0 | 8.0 | 2.0 | 6.0 | 8.0 | 2.8 |

As shown in Table 7 above, IF2 was also found to have a surprisingly long duration, in particular a duration of greater than 7.5 hours (i.e. greater than 450 minutes). Duration was assessed according to the 90% repellency parameters. Moreover, IF2 was also found to exhibit a surprisingly large improvement in duration time, as compared to the actives package alone. In particular, the ratio of the duration of IF2 with respect to the duration the actives package alone (AP2) was surprising found to be greater than 2.5 to 1, in this case 2.8 to 1. Notably, the addition of the layered technologies comprised in IF2 surprisingly nearly tripled the duration of the actives package also comprised in IF2. The surprisingly long durations of formulation IF2, in combination with its other commercially desirable properties (such as fragrance and skin-feel) make formulation IF2 particularly beneficial for use in insect repellents.

It is especially surprising that IF2 demonstrates significantly improved duration even when compared to CF1, which includes the same essential oils, same initial fixative, same solubilizer, same emulsifier, and the same co-emulsifier as IF2.

Additionally, the water-based formulations of the present disclosure not only exhibit surprisingly long average durations of CPT, but their specific formulations enable them to exhibit a positive skin-feel as well as a pleasant odor. Compositions with formulations that differ from those contemplated herein may exhibit the balance of these traits, even if they happen to exhibit one or two of these traits.

Any of the embodiments described herein may be modified to include any of the structures, compositions, or methodologies disclosed in connection with different embodiments.

The following embodiments are provided as potential example compositions of the present disclosure:

Embodiment 1. A composition for repelling insects, the composition comprising:
  i. an active component comprising clove oil, peppermint oil, and geranium oil;
  ii. a fixative; and
  iii. a solubilizer.

Embodiment 2. A composition for repelling insects, the composition comprising:
  i. an active component comprising:
    a) at least one essential oil selected from the group consisting of clove oil, geraniol, and lemongrass oil; and
    b) at least two essential oils selected from the group consisting of peppermint oil, geranium oil, thyme oil, citronella oil, and eugenol; and
  ii. a fixative; and
  iii. a solubilizer.

Embodiment 3. A composition for repelling insects, the composition comprising:
  i. an active component comprising:
    a) clove oil, geranium oil, and peppermint oil; or
    b) clove oil, thyme oil, and citronella oil;
  ii. a fixative; and
  iii. a solubilizer.

Embodiment 4. The composition of embodiments 1 or 2, wherein the active component consists essentially of clove oil, geranium oil, and peppermint oil.

Embodiment 5. The composition of any one embodiment 1-3, wherein the active component consists of clove oil, geranium oil, and peppermint oil.

Embodiment 4. The composition of any one embodiment 1-3, wherein the fixative is selected from the group consisting of vanillin, esters of organic acids, fumed silica, alkoxylated alcohols, glycol ethers, glycerin aliphatic acid esters, polyethylene glycol, and any combination thereof.

Embodiment 5. The composition of any one embodiment 1-3, wherein the fixative is vanillin.

Embodiment 6. The composition of any one embodiment 1-3, wherein the fixative is a combination of vanillin and triethyl citrate.

Embodiment 7. The composition of any one embodiment 1-3, wherein the fixative is a combination of vanillin and fumed silica.

Embodiment 8. The composition of any one embodiment 1-3, wherein the solubilizer is selected from the group consisting of $C_1$-$C_8$ alcohols, hydrogenated oils, polyethoxylated oils, alkoxylated alcohols, alkylene glycols, glycol ethers, and any combination thereof.

Embodiment 9. The composition of any one embodiment 1-3, wherein the solubilizer is selected from the group consisting of isopropyl alcohol, PEG-40 hydrogenated castor oil, ethoxylated $C_8$-$C_{16}$ alcohol, propylene glycol, ethylene glycol n-hexyl ether, and any combination thereof.

Embodiment 10. The composition of any one embodiment 1-3, wherein the solubilizer is isopropyl alcohol.

Embodiment 11. The composition of any one embodiment 1-3, wherein the active component is present in an amount from about 5 wt. % to about 15 wt. % wherein all weight percentages are percent by weight of the total composition.

Embodiment 12. The composition of any one embodiment 1-3, wherein the active component is present in an amount from about 10 wt. % to about 12 wt. % wherein all weight percentages are percent by weight of the total composition.

Embodiment 13. The composition of any one embodiment 1-3, wherein the active component is present in an amount from about 11 wt. % to about 12 wt. % wherein all weight percentages are percent by weight of the total composition.

Embodiment 14. The composition of any one embodiment 1-3, wherein the active component comprises:
  i. from about 0.1 wt. % to about 3.0 wt. % of clove oil;
  ii. from about 0.5 wt. % to about 10.0 wt. % of geranium oil; and
  iii. from about 0.1 wt. % to about 10.0 wt. % of peppermint oil,
wherein all weight percentages are percent by weight of the total composition.

Embodiment 15. The composition of any one embodiment 1-3, wherein the active component comprises:
  i. from about 0.1 wt. % to about 1.0 wt. % of clove oil;
  ii. from about 4.5 wt. % to about 7.5 wt. % of geranium oil; and
  iii. from about 3.0 wt. % to about 6.0 wt. % of peppermint oil,
wherein all weight percentages are percent by weight of the total composition.

Embodiment 16. The composition of any one embodiment 1, wherein the active component comprises:
  i. about 0.5 wt. % of clove oil;
  ii. about 6.5 wt. % of geranium oil; and
  iii. about 4.5 wt. % of peppermint oil,
wherein all weight percentages are percent by weight of the total composition.

Embodiment 17. The composition of any one embodiment 1-3, wherein the fixative is present in an amount from about 3 wt. % to about 15 wt. % wherein all weight percentages are percent by weight of the total composition.

Embodiment 18. The composition of any one embodiment 1-3, wherein the fixative is present in an amount from about 5 wt. % to about 10 wt. % wherein all weight percentages are percent by weight of the total composition.

Embodiment 19. The composition of any one embodiment 1-3, wherein the solubilizer is present in an amount from about 5 wt. % to about 45 wt. % wherein all weight percentages are percent by weight of the total composition.

Embodiment 20. The composition of any one embodiment 1-3, wherein the solubilizer is present in an amount from about 10 wt. % to about 30 wt. % wherein all weight percentages are percent by weight of the total composition.

Embodiment 21. The composition of any one embodiment 1-3, wherein the solubilizer is present in an amount from about 5 wt. % to about 15 wt. % wherein all weight percentages are percent by weight of the total composition.

Embodiment 22. The composition of any one embodiment 1-3, wherein the solubilizer is present in an amount from about 25 wt. % to about 35 wt. % wherein all weight percentages are percent by weight of the total composition.

Embodiment 23. A composition for repelling insects, the composition comprising:
  i. an active component comprising clove oil, peppermint oil, and geranium oil;
  ii. a fixative;
  iii. a solubilizer; and
  iv. a carrier.

Embodiment 24. The composition of embodiment 24, wherein the carrier is water.

Embodiment 25. The composition of embodiment 24, wherein the carrier is present in an amount from about 60 wt. % to about 80 wt. % wherein all weight percentages are percent by weight of the total composition.

Embodiment 26. The composition of embodiment 24, wherein the carrier is present in an amount from about 68 wt. % to about 70 wt. % wherein all weight percentages are percent by weight of the total composition.

Embodiment 27. The composition of embodiment 24, wherein the fixative is selected from the group consisting of vanillin, esters of organic acids, fumed silica, alkoxylated alcohols, glycol ethers, glycerin aliphatic acid esters, polyethylene glycol, and any combination thereof.

Embodiment 28. The composition of embodiment 24, wherein the fixative is vanillin.

Embodiment 29. The composition of embodiment 24, wherein the fixative is a combination of vanillin and triethyl citrate.

Embodiment 30. The composition of embodiment 24, comprising from about 7 wt. % to about 15 wt. % of the fixative, and wherein the fixative comprises vanillin and triethyl citrate.

Embodiment 31. The composition of embodiment 24, wherein the fixative is a combination of vanillin and fumed silica.

Embodiment 32. The composition of embodiment 24, wherein the fixative is present in an amount from about 3 wt. % to about 15 wt. % wherein all weight percentages are percent by weight of the total composition.

Embodiment 33. The composition of embodiment 24, wherein the fixative is present in an amount from about 5 wt. % to about 10 wt. % wherein all weight percentages are percent by weight of the total composition.

Embodiment 34. The composition of embodiment 24, wherein the solubilizer is selected from the group consisting of $C_1$-$C_8$ alcohols, hydrogenated oils, polyethoxylated oils, alkoxylated alcohols, alkylene glycols, glycol ethers, and any combination thereof.

Embodiment 35. The composition of embodiment 24, wherein the solubilizer is selected from the group consisting of isopropyl alcohol, PEG-40 hydrogenated castor oil, ethoxylated $C_8$-$C_{16}$ alcohol, propylene glycol, ethylene glycol n-hexyl ether, and any combination thereof.

Embodiment 36. The composition of embodiment 24, wherein the solubilizer is isopropyl alcohol.

Embodiment 37. The composition of embodiment 24, wherein the solubilizer is present in an amount from about 5 wt. % to about 45 wt. % wherein all weight percentages are percent by weight of the total composition.

Embodiment 38. The composition of embodiment 24, wherein the solubilizer is present in an amount from about 5 wt. % to about 15 wt. % wherein all weight percentages are percent by weight of the total composition.

Embodiment 39. A composition for repelling insects, the composition comprising:
  i. from about 5 wt. % to about 15 wt. % of an active component consisting essentially of:
    a) from about 0.1 wt. % to about 3.0 wt. % of clove oil;
    b) from about 0.5 wt. % to about 10.0 wt. % of geranium oil; and
    c) from about 0.1 wt. % to about 10.0 wt. % of peppermint oil;
  ii. from about 3 wt. % to about 15 wt. % of a fixative;
  iii. from about 5 wt. % to about 15 wt. % of a solubilizer;
  iv. from about 60 wt. % to about 80 wt. % of a carrier;
  v. from about 0.1 wt. % to about 5.0 wt. % of a emulsifier,
wherein all weight percentages are percent by weight of the total composition.

Embodiment 40. The composition of embodiment 39, wherein the emulsifier is selected from the group consisting of saponins, glycerin aliphatic acid esters, gum arabic, mustard, lecithin, carrageenan, guar gum, monoglycerides, diglycerides, polysorbates, glyceryl ethers, alkyl sulfate anionic surfactants, alkyl ether sulfate anionic surfactants, and any combination thereof.

Embodiment 41. The composition of embodiment 39 wherein the emulsifier is selected from the group consisting of a *Quillaja* saponin and a polyglyceryl oleate.

Embodiment 42. The composition of embodiment 39 wherein the emulsifier is a combination of a *Quillaja* saponin and a polyglyceryl oleate.

Embodiment 43. The composition of embodiment 39, wherein the emulsifier is present in an amount from about 0.5 wt. % to about 1.5 wt. % wherein all weight percentages are percent by weight of the total composition.

Embodiment 44. The composition of embodiment 39 further comprising a thickener.

Embodiment 45. The composition of embodiment 39, wherein the thickener is selected from the group consisting of cellulose derivatives, gums, pectin, carrageenan, starch, bentonite, and combinations thereof.

Embodiment 46. The composition of embodiment 39, wherein the thickener is microcrystalline cellulose.

Embodiment 47. The composition of embodiment 39, wherein the thickener is present in an amount from about 0.1 wt. % to about 5.0 wt. % wherein all weight percentages are percent by weight of the total composition.

Embodiment 48. The composition of embodiment 39, wherein the thickener is present in an amount from about 0.5 wt. % to about 1.5 wt. % wherein all weight percentages are percent by weight of the total composition.

Embodiment 49. The composition of embodiment 39, further comprising a humectant.

Embodiment 50. The composition of embodiment 39 wherein the humectant is selected from the group consisting of glycerin, propylene glycol, diglycerin, sodium pryoglutamic acid, hyaluronic acid, pentylene glycol, squalene, sodium hyaluronate, butylene glycol, aloe vera, coconut butter, coconut oil, grape seed oil, red raspberry seed oil, shea butter, and combinations thereof.

Embodiment 51. The composition of embodiment 39, wherein the humectant is glycerin.

Embodiment 52. The composition of embodiment 39, wherein the humectant is present in an amount from about 0.1 wt. % to about 5.0 wt. % wherein all weight percentages are percent by weight of the total composition.

Embodiment 53. The composition of embodiment 39, wherein the humectant is present in an amount from about 1 wt. % to about 3 wt. % wherein all weight percentages are percent by weight of the total composition.

Embodiment 54. The composition of embodiment 39 further comprising a film former.

Embodiment 55. The composition of embodiment 39, wherein the film former is selected from the group consisting of cellulose derivatives, acrylamide polymers, acrylate polymers, alginates, carrageenan, cellulose gum, hydroxypropyl guar, maltodextrin, polyacrylamide, polyacrylic acid, polyethylene, polyquaterniums, polyvinyl acetate, polyvinyl alcohol, tragacanth gum, and combinations thereof.

Embodiment 56. The composition of embodiment 39, wherein the film former is a cellulose derivative.

Embodiment 57. The composition of embodiment 39, wherein the film former is hydroxypropyl methylcelluose.

Embodiment 58. The composition of embodiment 39, wherein the film former is present in an amount from about 0.1 wt. % to about 5.0 wt. % wherein all weight percentages are percent by weight of the total composition.

Embodiment 59. The composition of embodiment 39, wherein the film former is present in an amount from about 1 wt. % to about 3 wt. % wherein all weight percentages are percent by weight of the total composition.

Embodiment 60. The composition of embodiment 39, wherein the composition has a complete protection time (CPT) that is greater than or equal to 2 hours, as measured by a "K & D Module Repellency Test".

Embodiment 61. The composition of embodiment 39, wherein the composition has a complete protection time (CPT) that is greater than or equal to 4 hours, as measured by a "K & D Module Repellency Test".

Embodiment 62. The composition of embodiment 39, wherein the composition has a complete protection time (CPT) that is greater than or equal to 6 hours, as measured by a "K & D Module Repellency Test".

Embodiment 63. The composition of embodiment 39, wherein the composition has a complete protection time (CPT) that is greater than or equal to 8 hours, as measured by a "K & D Module Repellency Test".

Embodiment 64. A composition for repelling insects, the composition comprising:
  i. an active component consisting essentially of
    a) from about 0.1 wt. % to about 3.0 wt. % of clove oil;
    b) from about 0.5 wt. % to about 10.0 wt. % of geranium oil; and
    c) from about 0.1 wt. % to about 10.0 wt. % of peppermint oil;
  ii. a fixative; and
  iii. a solubilizer, and
wherein the composition has a complete protection time (CPT) that is greater than or equal to 2.5 hours, as measured by a "K & D Module Repellency Test",
wherein all weight percentages are percent by weight of the total composition.

Embodiment 65. The composition of embodiment 68, wherein the composition has a complete protection time (CPT) that is greater than or equal to 2.7 hours, as measured by a "K & D Module Repellency Test".

Embodiment 66. The composition of embodiment 68, wherein the composition further comprises:
  iv. from about 60 wt. % to about 80 wt. % of a carrier;
  v. from about 0.1 wt. % to about 5.0 wt. % of a emulsifier;
  vi. from about 0.1 wt. % to about 5.0 wt. % of a thickener;
wherein the composition has a complete protection time (CPT) that is greater than or equal to 4 hours, as measured by a "K & D Module Repellency Test", wherein all weight percentages are percent by weight of the total composition.

Embodiment 67. The composition of embodiment 70, wherein the composition has a complete protection time (CPT) that is greater than or equal to 6 hours, as measured by a "K & D Module Repellency Test".

Embodiment 68. The composition of embodiment 70, wherein the composition has a complete protection time (CPT) that is greater than or equal to 8 hours, as measured by a "K & D Module Repellency Test".

Embodiment 69. The composition of embodiment 68, wherein the composition further comprises:
iv. from about 60 wt. % to about 80 wt. % of a carrier;
v. from about 0.1 wt. % to about 5.0 wt. % of a emulsifier;
vi. from about 0.1 wt. % to about 5.0 wt. % of a humectant; and
vii. from about 0.1 wt. % to about 5.0 wt. % of a film former; and
wherein the composition has a complete protection time (CPT) that is greater than or equal to 4 hours, as measured by a "K & D Module Repellency Test",
wherein all weight percentages are percent by weight of the total composition.

Embodiment 70. The composition of embodiment 73, wherein the composition has a complete protection time (CPT) that is greater than or equal to 6 hours, as measured by a "K & D Module Repellency Test".

Embodiment 71. The composition of embodiment 73, wherein the composition has a complete protection time (CPT) that is greater than or equal to 8 hours, as measured by a "K & D Module Repellency Test".

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the disclosure and to teach the best mode of carrying out same. The exclusive rights to all modifications which come within the scope of the appended claims are reserved.

The invention claimed is:

1. A composition for repelling insects, the composition comprising:
i. from about 2.5 wt. % to about 15 wt. % of an active component consisting essentially of:
a) from about 0.1 wt. % to about 5.0 wt. % of clove oil;
b) from about 0.5 wt. % to about 15.0 wt. % of geranium oil; and
c) from about 0.1 wt. % to about 15.0 wt. % of peppermint oil;
ii. from about 1 wt. % to about 15 wt. % of a fixative;
iii. from about 3 wt. % to about 20 wt. % of a solubilizer;
iv. from about 60 wt. % to about 85 wt. % of a carrier; and
v. from about 0.1 wt. % to about 7.5 wt. % of an emulsifier,
wherein all weight percentages are percent by weight of the total composition.

2. The composition of claim 1, the composition further comprising from about 7 wt. % to about 15 wt. % of the fixative.

3. The composition of claim 1, wherein the fixative comprises a combination of vanillin and triethyl citrate.

4. The composition of claim 1, the composition further comprising from about 7 wt. % to about 15 wt. % of the fixative, and
wherein the fixative comprises a combination of vanillin and triethyl citrate.

5. The composition of claim 1 wherein the emulsifier is selected from the group consisting of a *Quillaja saponin*, a polyglyceryl oleate, and combinations thereof.

6. The composition of claim 1, the composition further comprising a thickener.

7. The composition of claim 1, the composition further comprising a humectant.

8. The composition of claim 1, the composition further comprising a film former.

9. The composition of claim 1, wherein the composition has a duration that is greater than or equal to 7.5 hours.

10. A composition for repelling insects, the composition comprising:
i. an active component consisting essentially of:
a) about 0.1 wt. % to about 5.0 wt. % clove oil; and
b) individually about 0.1 wt. % to about 15 wt. % of at least two essential oils selected from the group consisting of peppermint oil, geranium oil, thyme oil, citronella oil, geraniol, lemongrass oil, and eugenol;
ii. a fixative; and
iii. a solubilizer,
wherein all weight percentages are percent by weight of the total composition.

11. The composition of claim 10, wherein the composition comprises
ii. from about 1 wt. % to about 15 wt. % of the fixative; and
iii. from about 3 wt. % to about 20 wt. % of the solubilizer.

12. The composition of claim 10, wherein the active component consists of clove oil, geranium oil, and peppermint oil.

13. The composition of claim 10, wherein the active component is present in an amount from about 5 wt. % to about 15 wt. % wherein all weight percentages are percent by weight of the total composition.

14. The composition of claim 10, wherein the active component consists essentially of:
i. from about 0.1 wt. % to about 5.0 wt. % of clove oil;
ii. from about 0.5 wt. % to about 15.0 wt. % of geranium oil; and
iii. from about 0.1 wt. % to about 15.0 wt. % of peppermint oil,
wherein all weight percentages are percent by weight of the total composition.

15. The composition of claim 14, wherein the active component consists essentially of:
i. from about 0.1 wt. % to about 3.0 wt. % of clove bud oil;
ii. from about 0.5 wt. % to about 10.0 wt. % of geranium oil; and
iii. from about 0.1 wt. % to about 10.0 wt. % of peppermint oil,
wherein all weight percentages are percent by weight of the total composition.

16. The composition of claim 14, wherein the active component consists of:
i. from about 0.1 wt. % to about 3.0 wt. % of clove bud oil;
ii. from about 0.5 wt. % to about 10.0 wt. % of geranium oil; and
iii. from about 0.1 wt. % to about 10.0 wt. % of peppermint oil,
wherein all weight percentages are percent by weight of the total composition.

17. A composition for repelling insects, the composition comprising:
- i. an active component comprising consisting essentially of:
  - a) about 0.1 wt. % to about 5.0 wt. % of at least one essential oil selected from the group consisting of clove oil, geraniol, and lemongrass oil; and
  - b) individually about 0.1 wt. % to about 15.0 wt. % of at least two essential oils selected from the group consisting of peppermint oil, geranium oil, thyme oil, citronella oil, and eugenol; and
- ii. a fixative; and
- iii. a solubilizer,
- wherein all weight percentages are percent by weight of the total composition.

18. The composition of claim 17, the composition further comprising a carrier.

19. The composition of claim 18, wherein the carrier is water.

20. The composition of claim 18, wherein the carrier is present in an amount from about 60 wt. % to about 85 wt. % wherein all weight percentages are percent by weight of the total composition.

* * * * *